(12) United States Patent
Schultz et al.

(10) Patent No.: US 9,838,204 B2
(45) Date of Patent: Dec. 5, 2017

(54) IOT COMMUNICATION UTILIZING SECURE ASYNCHRONOUS P2P COMMUNICATION AND DATA EXCHANGE

(71) Applicant: Verizon Patent and Licensing Inc., Arlington, VA (US)

(72) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 251 days.

(21) Appl. No.: 14/712,676

(22) Filed: May 14, 2015

(65) Prior Publication Data

US 2016/0337127 A1 Nov. 17, 2016

(51) Int. Cl.
*H04L 9/32* (2006.01)
*H04L 29/06* (2006.01)
*H04W 4/00* (2009.01)
*H04W 12/04* (2009.01)
*H04L 29/08* (2006.01)
*H04W 12/06* (2009.01)

(52) U.S. Cl.
CPC .......... *H04L 9/3234* (2013.01); *H04L 9/3265* (2013.01); *H04L 9/3268* (2013.01); *H04L 63/0823* (2013.01); *H04L 67/12* (2013.01); *H04W 4/005* (2013.01); *H04W 12/04* (2013.01); *H04L 63/0876* (2013.01); *H04W 12/06* (2013.01)

(58) Field of Classification Search
CPC .................................................. H04L 9/3234

USPC ......................................................... 713/157
See application file for complete search history.

(56) References Cited

U.S. PATENT DOCUMENTS

2003/0056093 A1* 3/2003 Huitema ........... H04L 29/12009
 713/156
2004/0139316 A1* 7/2004 Kotani ..................... G06F 21/32
 713/156

(Continued)

OTHER PUBLICATIONS

Brumfield, "Verizon Launches New Portal Geared at Securing Large-Scale Deployments of Internet of Things," http://news.verizonenterprise.com/2015/01/verizon-portal-security-iot-m2m/, Jan. 28, 2015, 4 pages.

(Continued)

*Primary Examiner* — Anthony Brown
*Assistant Examiner* — Samuel Ambaye

(57) ABSTRACT

A device may receive a connection request including a digital certificate from an endpoint for establishing a secure connection for a communication, the digital certificate including a digital certificate chain identifying one or more certificate authorities associated with the digital certificate. The device may determine whether the digital certificate is valid based on the digital certificate chain identifying one or more certificate authorities trusted by the device. The device may determine whether the connection request includes a valid token. The device may generate a token based on the digital certificate being valid and an absence of a valid token included in the connection request. The device may associate the token with the digital certificate. The device may distribute the token to the endpoint. The device may establish the secure connection with the endpoint using the token associated with the digital certificate.

20 Claims, 17 Drawing Sheets

(56) References Cited

U.S. PATENT DOCUMENTS

2007/0245414 A1* 10/2007 Chan ................... H04L 63/0823
    726/12
2013/0047240 A1* 2/2013 Radhakrishnan ... H04L 63/0807
    726/9

OTHER PUBLICATIONS

Wikipedia, "X.509," http://en.wikipedia.org/wiki/X.509, Apr. 27, 2015, 13 pages.
Wikipedia, "Docker (software)," http://en.wikipedia.org/wiki/Docker_%28software%29, Apr. 25, 2015, 5 pages.

* cited by examiner

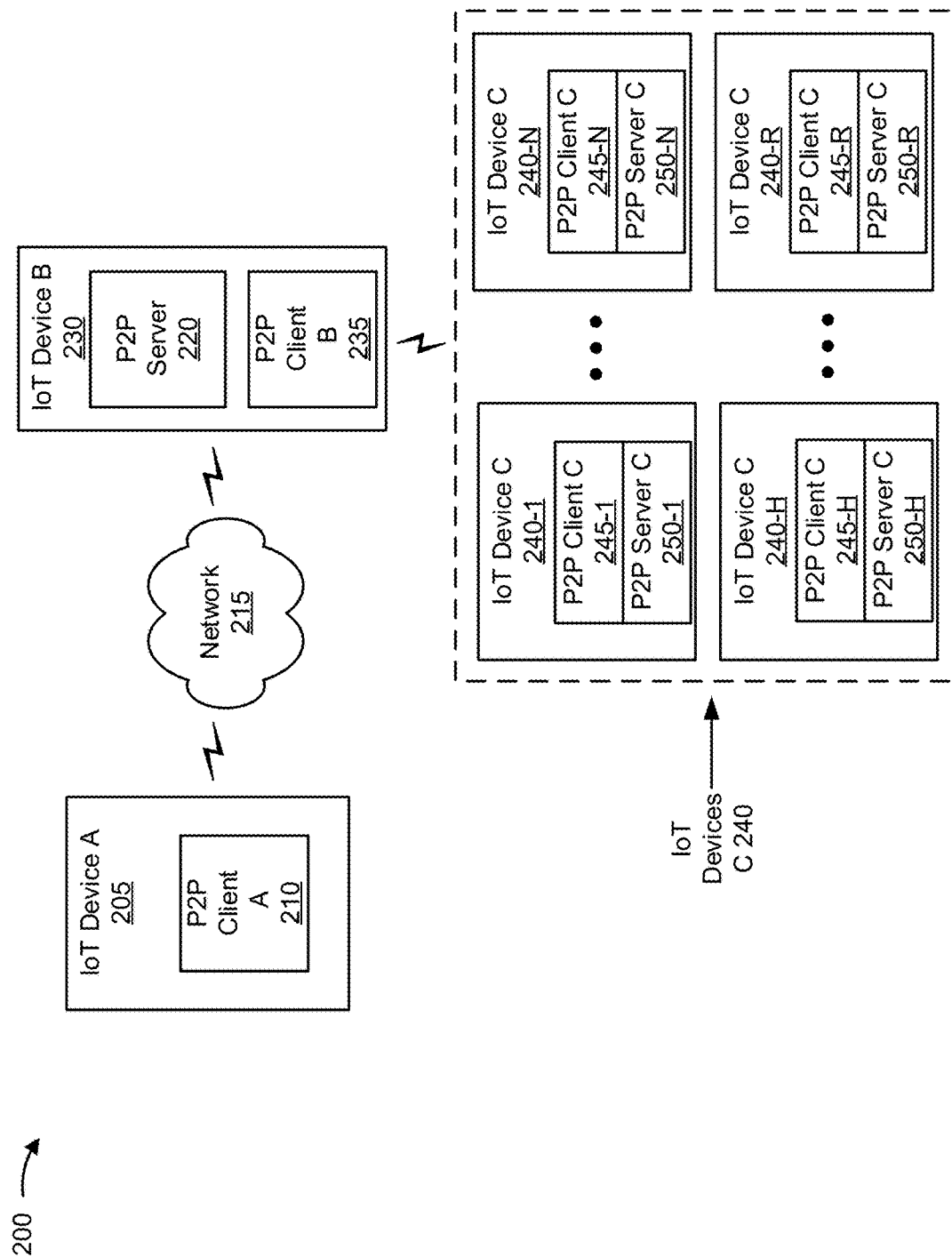

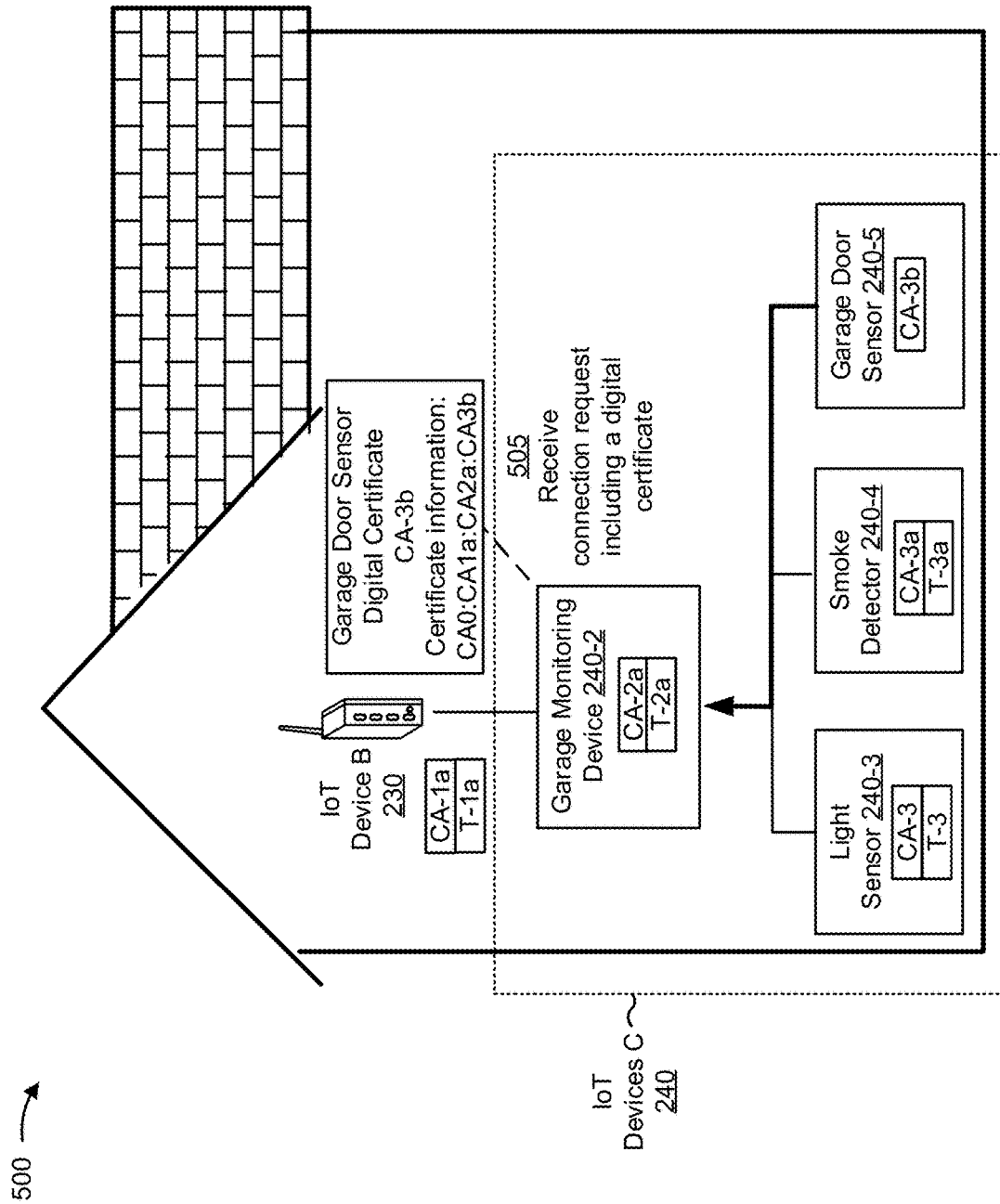

IOT COMMUNICATION UTILIZING SECURE ASYNCHRONOUS P2P COMMUNICATION AND DATA EXCHANGE

BACKGROUND

The Internet of things (IoT) refers to a network of physical objects with Internet connectivity, and the communication between such objects and other Internet-enabled devices and systems. The IoT extends Internet connectivity beyond traditional devices (e.g., desktop computers, laptop computers, smart phones, tablets, etc.) to a range of devices and everyday things that may utilize embedded technology to communicate and interact with an external environment via the Internet.

BRIEF DESCRIPTION OF THE DRAWINGS

FIG. 2A-2B are diagrams of an example environment in which systems and/or methods, described herein, may be implemented;

FIG. 5A-5F are diagrams of an example implementation relating to the example process shown in FIGS. 4A-4B.

DETAILED DESCRIPTION OF PREFERRED EMBODIMENTS

Figure 1A:
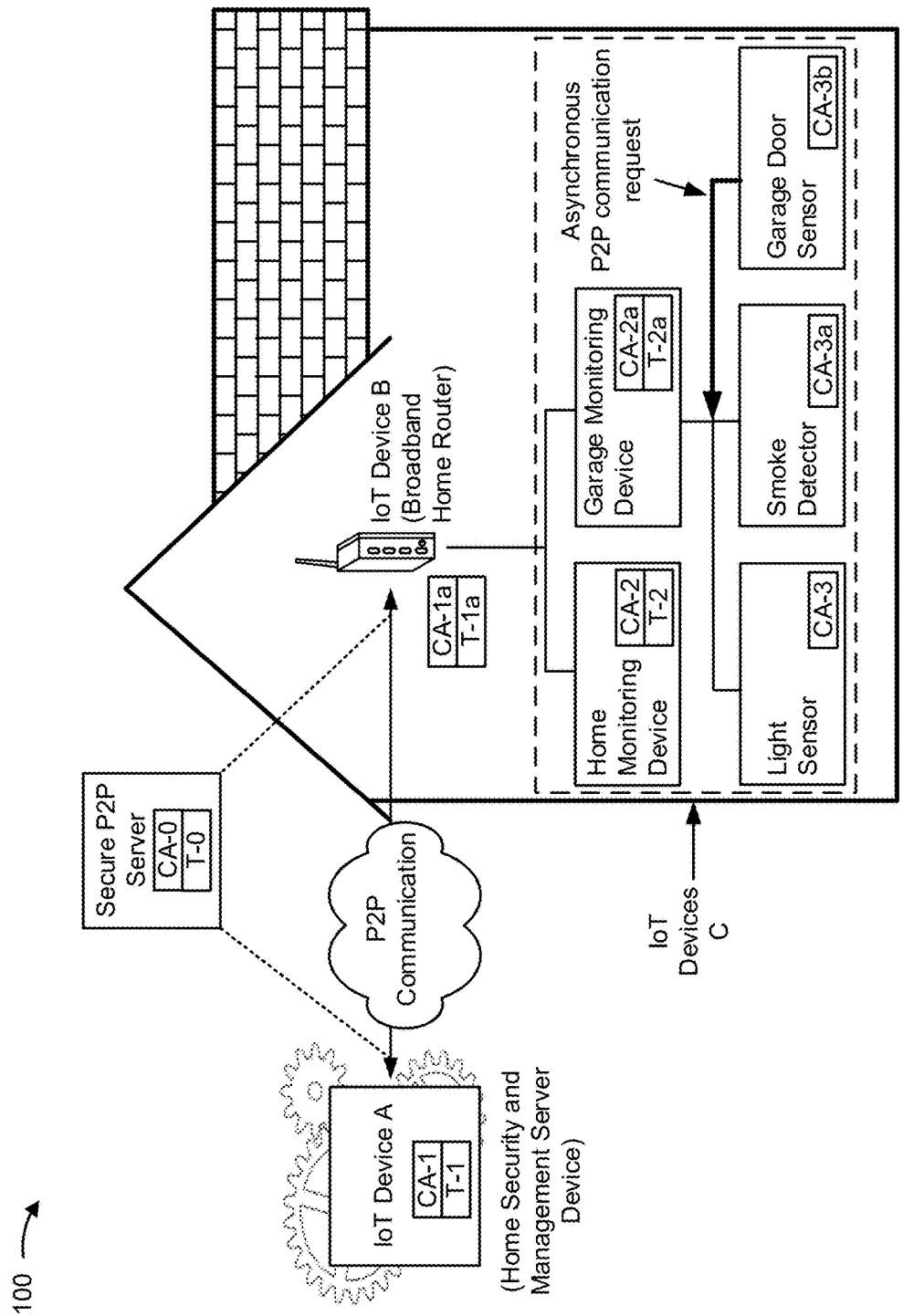
FIGS. 1A-1B are diagrams of an overview of an example implementation described herein.

The following detailed description of example implementations refers to the accompanying drawings. The same reference numbers in different drawings may identify the same or similar elements.

IoT refers to a network of physical objects (IoT devices) embedded with electronics, software, sensors, and connectivity to enable the IoT devices to achieve greater value and service by exchanging data with manufacturers, operators, and/or other connected devices. An IoT device is identifiable through the IoT device's embedded computing system and includes an Internet Protocol (IP) address for connectivity. IoT devices may include connected security systems, thermostats, cars, electronic appliances, lights, alarm clocks, speaker systems, vending machines, industrial sensors and actuators, wearable computers, and much more.

Presently, there are billions of IoT devices connected to the Internet and growing. Traditional client-server communications may not be able to provide bandwidth necessary to support a high volume of communications attributed to the IoT devices acting as endpoints for the communications. Additionally, with concerns over communications security, data security, privacy, and such, resulting from an increasing quantity of IoT devices, users of IoT devices may prefer to communicate with and share information directly between IoT devices without communicating with and/or having data stored anywhere.

Peer-to-peer (P2P) communications and data exchange (hereinafter referred to collectively as a "P2P communication") may be used to support, or in addition to, traditional client-server communications in order to accommodate the increasing quantity of IoT devices and/or to scale an IoT network. A P2P communication (e.g., file sharing, video messaging, audio messaging, instant messaging, voice over IP communications, sensing, actuation, etc.) is a decentralized communications model in which each party (or endpoint) to the P2P communication has the same capabilities. Either endpoint may initiate a communication session. Unlike a traditional client-server model, in which a client makes a service request and a server fulfills the request, the P2P endpoints may function as the client and the server.

However, many IoT devices require periodic interconnection for P2P communications. A P2P communication requires both endpoints to the P2P communication to be on-line and available to share the communication and exchange data, again leading to issues of supporting a high volume of endpoints and bandwidth requirements for scaling an IoT network. Endpoint context (e.g., a location, network connectivity, time between communications, etc.) for an IoT device may also change periodically, leading to problems of communications security, data security, and/or privacy. These problems are exacerbated as the IoT network is scaled.

Implementations described herein may permit endpoints to communicate asynchronously and securely by using a combination of digital certificates and associated tokens. An endpoint association (or a trust relationship between endpoints) may be created using digital certificates, endpoint fingerprinting, and context information for client-server and P2P communications. Associated endpoints may receive tokens associated with the digital certificates and with a time-to-live, during which time P2P communications are possible. Associated endpoints may establish secure containers for receiving, managing, and/or storing data exchanged in an isolated manner. Endpoint association may be created in advance or at a time of receiving a connection request, alleviating the problems of communications security, data security, and/or privacy caused by the context information changing.

Figure 1B:
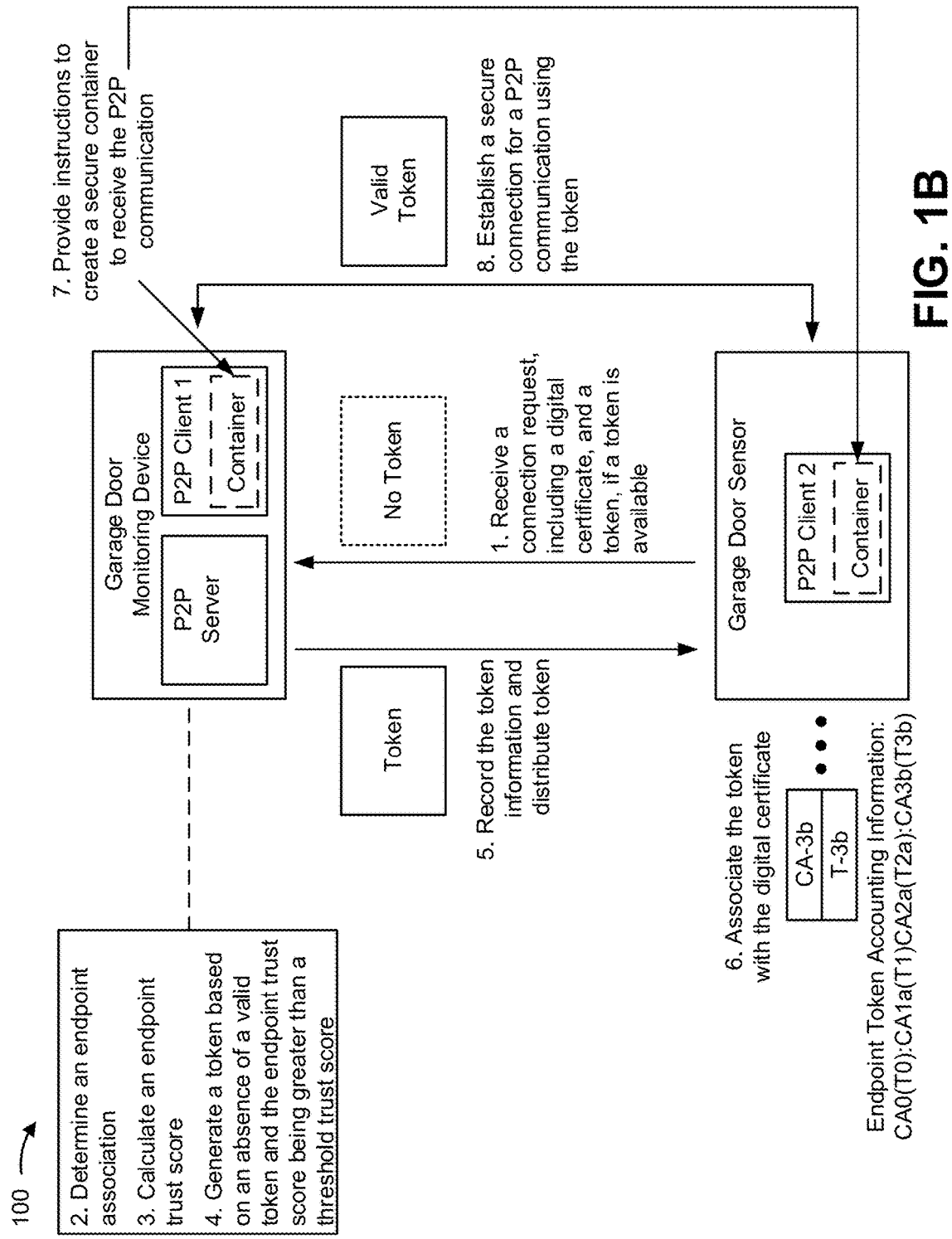

FIGS. 1A-1B are diagrams of an overview of an example implementation 100 described herein. As shown in FIG. 1A, assume IoT device A is a home security and management (HSM) server device associated with a HSM network (not shown) that provides a variety of services, such as home security, home automation, home health care, or the like, for a user at a location (e.g., a home). The HSM server device may provide information to and receive information from IoT devices C (e.g., a garage monitoring device, a home monitoring device, etc.), via IoT device B (e.g., a broadband home router or BHR), using a secure P2P communication (P2P communication).

A secure P2P client (P2P client) and a secure P2P server (P2P server) (i.e., a lightweight server or a heavyweight server depending on the device) may be included in one or more IoT devices in a network (e.g., the HSM server device, the BHR, the IoT Devices C, etc.). The P2P server may facilitate and/or mediate a P2P communication between two IoT devices. As shown in FIG. 1A, the P2P server may also be an independent P2P server, such as the P2P server connected between the HSM and the BHR.

Prior to a P2P communication between IoT devices, the P2P server may create an endpoint association for one or more endpoints in the network. An endpoint association allows the P2P server to obtain information about whether to trust the one or more endpoints in order to allow a connection and establish the P2P communication.

To create the endpoint association, the P2P server may use digital certificates (e.g., X.509 certificates) issued by a certificate authority (CA), perform endpoint fingerprinting, and/or gather context information for the endpoint providing the connection request. A digital certificate is a sequence of bytes that contains, in a specific format, certificate information (e.g., a subject, a public key, a certificate serial number, an origin and distribution path for the digital certificate, a valid period of time for the digital certificate, etc.) over which a digital signature is computed and embedded in the digital certificate.

The CA, issuing the digital certificate, may be a third party CA and/or or a P2P server. A digital certificate issued by the CA to itself is referred to as a trusted root certificate and is intended to establish the CA as a point of ultimate trust ("a trusted root") for a CA structure (e.g., hierarchy, central, partial mesh, full mesh, etc.). The trusted root certificate may act as a private key used to sign other digital certificates. Digital certificates immediately below the trusted root certificate inherit the trustworthiness of the trusted root certificate.

The trusted root may authorize subordinate CAs to issue digital certificates (intermediary CAs). Software applications accepting the digital certificates issued by the intermediary CAs assume the digital certificates are as trustworthy as the trusted root certificate and expect the intermediary CAs to verify an identity and an intention of endpoints that receive the digital certificates from the intermediary CAs.

As shown in FIG. 1A, the independent P2P server may act as the trusted root and create the trusted root certificate (e.g., CA-0). The independent P2P server may provide digital certificates to the HSM server device (e.g., CA-1) and the BHR (e.g., CA-1a). The independent P2P server may authorize an intermediary CA. For example, the independent P2P server may authorize the P2P server included in the BHR to further provide digital certificates to one or more IoT Devices C (e.g., the home monitoring device receives a digital certificate CA-2, the garage monitoring device receives a digital certificate CA-2a, etc.).

Additionally, or alternatively, the P2P server included in the BHR may authorize one or more P2P servers included in subordinate IoT Devices C to provide digital certificates. For example, the P2P server included in the BHR may authorize the P2P server included in the garage monitoring device to provide digital certificates to subordinate IoT Devices C (e.g., a light sensor receives a digital certificate CA-3, a smoke detector receives a digital certificate CA-3a, a garage door sensor receives a digital certificate CA-3b, etc.).

The digital certificate may include certificate information, including information identifying one or more certificate authorities associated with the digital certificate and identifying the digital certificate's origin and distribution path (or a digital certificate chain). The certificate information may provide a basis for authenticating and/or authorizing the P2P communication and/or data exchange. For example, the digital certificate provided to the garage door sensor (e.g., CA-3b) may include a digital certificate chain, tracing the origin and the distribution for the digital certificate from the independent P2P server (e.g., CA-0) to the BHR (e.g., CA-1a), from the BHR to the garage monitoring device (e.g., CA-2a), and from the garage monitoring device to the garage door sensor.

The digital certificate chain for the garage door sensor's digital certificate may be determined and/or expressed, for example, as CA0:CA1a:CA2a:CA3b. The certificate information, including the digital certificate chain, may also be used for verification and/or accounting purposes (e.g., recordkeeping, non-repudiation, etc.). IoT devices may receive tokens for further authentication and/or authorization purposes. The tokens may be associated with the digital certificates of the IoT devices receiving the tokens (e.g., token T-0 is associated with CA-0; token T-1a is associated with CA-1a; token T-2a is associated with CA-2a, etc.).

Additionally and/or alternatively, to create the endpoint association, the P2P server may also perform endpoint fingerprinting by gathering endpoint fingerprint information (e.g., device information, network information, clock skew information, etc.) for the endpoint attempting the connection request. The P2P server may also gather context information (e.g., a date, a time, a location, user-entered information, connections to other IoT devices, etc.) for the endpoint.

The endpoint association may be created for all endpoints simultaneously by one or more P2P servers (e.g., by the independent P2P server, by the P2P server included in an IoT Device C, etc.). The endpoint association may also be created asynchronously between the endpoints at the time of a P2P communication. The endpoint association may be localized to a pair of endpoints attempting to engage in the P2P communication. For example, the endpoint association may be created asynchronously by the P2P server receiving the connection request (e.g., the P2P server included in the garage monitoring device) from another endpoint (e.g., the garage door sensor) at the time of the connection request. Endpoint information includes certificate information, endpoint fingerprint information, and context information.

As shown in FIG. 1A, assume the garage door sensor attempts to communicate asynchronously in order to establish a P2P communication with the garage monitoring device. As shown in FIG. 1B, and by reference number 1, the P2P server included in the garage monitoring device receives a connection request from an endpoint (e.g., the garage door sensor). The connection request may include a digital certificate. The connection request may also include a token, including token information. Token information may include endpoint token accounting information, including an association between a token with a digital certificate, a time-to-live, a security level, source information, a token identifier, etc.

As shown in FIG. 1B, and by reference number 2, the P2P server may determine an endpoint association for the garage door sensor by verifying the certificate information, associated with the digital certificate, to determine if the digital certificate is valid. For example, the garage door sensor's certificate information may include a digital certificate chain (e.g., expressed as CA0:CA1a:CA2a:CA3b) identifying that the P2P server with the digital certificate (e.g., CA-2a) issued the digital certificate installed on the garage door sensor (e.g., CA-3b). As such, the P2P server, as the issuer of the digital certificate may determine the digital certificate installed on the garage door sensor to be valid.

Additionally, or alternatively, as shown by reference number 2, the P2P server may create the endpoint association by performing endpoint fingerprinting and analyzing context information for the endpoint, based on endpoint fingerprint information and context information provided in the connection request. As shown in FIG. 1B, and by reference number 3, the P2P server may use the endpoint association to calculate an endpoint trust score for the endpoint. As shown in FIG. 1B, and by reference number 4, the P2P server may determine whether there is a valid token. As shown in FIG. 1B, and by reference number 4, the P2P server may generate a token for the P2P communication when the endpoint trust score is greater than a threshold trust score and based on an absence of a valid token. The token may be associated with the digital certificate.

As shown in FIG. 1B, and by reference number 5, the P2P server may record token information for the generated token and distribute the token to the endpoint. As shown in FIG. 1B, and by reference number 6, the P2P server may associate the token with the digital certificate (e.g., associating token T-3*b* to CA-3*b*). Additionally, or alternatively, the P2P server may create endpoint token accounting information for the token, associating tokens and digital certificates included in the digital chain for the digital certificate (e.g., CA0(T0): CA1(T1):CA2*a*(T2*a*):CA3*b*(T3*b*) providing an association between the tokens and the digital certificates included in the digital certificate chain for CA-3*b*). In some implementations, reference number 5 may occur prior to reference number 6.

As shown in FIG. 1B, and by reference number 7, the P2P server may provide instructions to P2P Client 1 and/or P2P Client 2 to may establish a secure container to receive the P2P communication. In some implementations, reference number 7 may occur prior to reference number 6 or even earlier.

As shown in FIG. 1B, and by reference number 8, the P2P server may establish the connection for the P2P communication using the token associated with the digital certificate.

By using a combination of digital certificates and tokens, in addition to determining an endpoint association, IoT devices may establish a connection to communicate asynchronously and securely using P2P communications and/or client-server communications. Secure containers may be created to receive, manage, and/or store the P2P and/or client-server communication in an isolated manner. The endpoint association and the tokens may be used to facilitate a subsequent communication between known endpoints.

While the description to follow will focus on a P2P communication, the description may also apply to client-server communications. For example, functionalities of the P2P server may be performed by a server in a client-server model. The functionalities of the P2P client may be carried out by a client in the client-server model. An IoT network may include P2P communications, client-server communications, and/or a combination of P2P communications and client-server communications between two or more IoT devices.

Figure 2A:
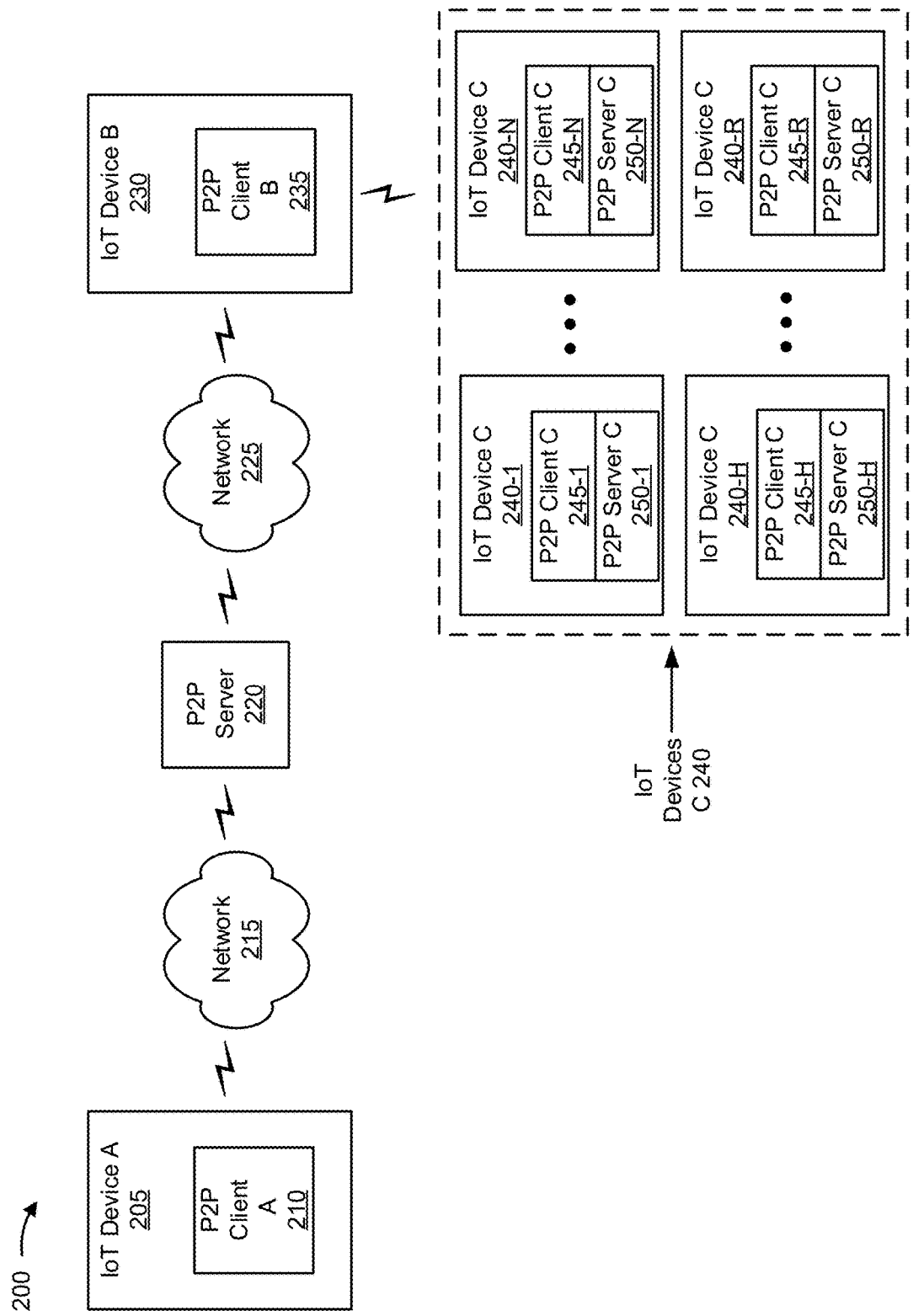

FIGS. 2A-2B are diagrams of example environments 200 in which systems and/or methods, described herein, may be implemented. As shown in FIGS. 2A-2B, environment 200 may include an IoT device A 205, a P2P client A 210, a network 215, a P2P server 220, a network 225, an IoT device B 230, a P2P client B 235, one or more IoT devices C 240-1 through 240-R (R≥1) (hereinafter referred to collectively as "IoT devices C 240," and individually as "IoT device C 240"), one or more P2P clients C 245-1 through 245-R (R≥1) (hereinafter referred to collectively as "P2P clients C 245," and individually as "P2P client C 245"), and/or one or more P2P servers C 250-1 through 250-R (R≥1) (hereinafter referred to collectively as "P2P servers C 250," and individually as "P2P server C 250"). Devices of environment 200 may interconnect via wired connections, wireless connections, or a combination of wired and wireless connections.

IoT device A 205 may include a device that is capable of receiving, processing, generating, determining, and/or providing information via an IoT network. For example, IoT device A 205 may include a computing device (e.g., a desktop computer, a laptop computer, a tablet computer, a handheld computer, a camera, an audio recorder, a camcorder, etc.), an appliance (e.g., a refrigerator, a microwave, a stove, etc.), a sensing device (e.g., a temperature sensor, a pressure sensor, an accelerometer, etc.), an actuating device, a processing device, a metering device, a machine-to-machine (M2M) device, a robotics device, a drone, a medical device, an automobile, a light bulb, and/or another type of device. In other words, IoT device A 205 may be any "thing" in the IoT network.

In some implementations, IoT device A 205 may include a communication interface that allows IoT device A 205 to receive information from and/or transmit information to P2P client A 210, P2P server 220, and/or another device. In some implementations, IoT device A 205 may include P2P client A 210 and/or P2P server 220.

P2P client A 210 may include a communication interface that allows P2P client A 210 to receive information from or transmit information to IoT device A 205, P2P server 220, and/or another device. In some implementations, P2P client A 210 may receive instructions to create a secure container located within P2P client A 210 and/or another device for receiving, managing, and/or storing P2P communications from IoT device A 205, IoT device B 230, IoT devices C 240, and/or other devices in an isolated manner.

P2P client A 210 may include an endpoint fingerprinting component for determining endpoint fingerprinting information for P2P client A 210. In some implementations, P2P client A 210 may include a P2P communications manager to mediate a P2P communication between two or more P2P clients in the absence of P2P server 220.

Network 215 may include one or more wired and/or wireless networks. For example, network 215 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, a mesh network, an intranet, the Internet, a fiber optic-based network, a cloud computing network, or the like, and/or a combination of these or other types of networks.

P2P server 220 may include one or more server devices capable of generating, processing, and/or providing information. For example, P2P server 220 may be capable of generating, processing, and/or providing information. For example, P2P server 220 may facilitate and/or mediate a P2P communication between IoT device A 205, IoT device B 230, and/or another device. In some implementations, P2P server 220 may include a communication interface that allows P2P server 220 to receive information and/or transmit information to IoT device A 205, IoT device B 230, and/or another device.

P2P server 220 may create an endpoint association for IoT device A 205, IoT device B 230, IoT devices C 240, and/or another device (hereinafter may be referred to collectively as "endpoints" and individually as an "endpoint"), by providing a digital certificate (e.g., an X.509 certificate) to one or more endpoints. P2P server 220 may verify validity of a digital certificate, provided by an endpoint requesting a connection, prior to establishing a secure connection for a P2P communication between two or more endpoints, via P2P server 220.

P2P server 220 may create the endpoint association by performing and/or storing endpoint fingerprint information (e.g., device information, network information, clock skew information, etc.) for the endpoint. P2P server 220 may interrogate the endpoint if the endpoint is unknown to P2P server 220 to obtain additional endpoint fingerprint information and/or to identify the endpoint. P2P server 220 may create the endpoint association by gathering context information (e.g., a date, a time, a location, user-entered information, connections to other IoT devices, etc.) for the endpoint.

P2P server 220 may determine an endpoint trust score for the endpoint. P2P server 220 may determine whether the endpoint trust score is greater than a threshold trust score. P2P server 220 may deny a connection request based on the endpoint trust score being less than or equal to the threshold trust score. P2P server 220 may determine whether the endpoint has a valid token.

P2P server 220 may generate a token and calculate a time-to-live for the token in an absence of a valid token. P2P server 220 may revoke, renew, and extend the time-to-live for the token. P2P server 220 may use token history information for previously generated tokens to calculate the time-to-live the token. P2P server 220 may adjust the endpoint trust score for subsequent connection requests (e.g., a second connection request from the endpoint, a third connection request from the endpoint, a fourth connection request from the endpoint, etc.) based on positive and/or negative P2P communications (e.g., adjust the endpoint trust score based on machine-learning).

A positive P2P communication includes P2P communications that are virus free, where privacy is maintained, where data security is not compromised, or the like. A negative P2P communication includes P2P communications that contain viruses, where privacy and data security are compromised, or the like. P2P server 220 may associate the token to the digital certificate provided by the endpoint.

P2P server 220 may establish a secure connection for the P2P communication between endpoints by using the valid token. P2P server 220 may authenticate and authorize the P2P communication using endpoint association and token information. P2P server 220 may provide accounting for digital certificates and tokens used to authenticate and/or authorize the P2P communication.

As shown in FIG. 2A, P2P server 220 may be independent. As shown in FIG. 2B, P2P server 220 may be included within IoT device B 230 (shown), IoT device A 205, and/or another device. When P2P server 220 is included within IoT device B 230, network 225 may be omitted.

Network 225 may include one or more wired and/or wireless networks. For example, network 225 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, a mesh network, an intranet, the Internet, a fiber optic-based network, a cloud computing network, or the like, and/or a combination of these or other types of networks.

IoT device B 230 may include a device that is capable of receiving, processing, generating, determining, and/or providing information via an IoT network. For example, IoT device B 230 may include a computing device (e.g., a desktop computer, a laptop computer, a tablet computer, a handheld computer, a camera, an audio recorder, a camcorder, etc.), an appliance (e.g., a refrigerator, a microwave, a stove, etc.), a sensing device (e.g., a temperature sensor, a pressure sensor, an accelerometer, etc.), an actuating device, a processing device, a metering device, a machine-to-machine (M2M) device, a robotics device, a drone, a medical device, an automobile, a light bulb, and/or another type of device. In other words, IoT device B 230 may be any "thing" in the IoT network.

In some implementations, IoT device B 230 may include a communication interface that allows IoT device B 230 to receive information from and/or transmit information to P2P client B 235, P2P server 220, and/or another device. In some implementations, IoT device B 230 may include P2P client B 235 and/or P2P server 220.

P2P client B 235 may include a communication interface that allows P2P client B 235 to receive information from or transmit information to IoT device B 230, P2P server 220, and/or another device. In some implementations, P2P client B 235 may receive instructions to create a secure container located within P2P client B 235 and/or another device for receiving, managing, and/or storing P2P communications from IoT device A 205, IoT device B 230, IoT devices C 240, and/or other devices in an isolated manner.

P2P client B 235 may include an endpoint fingerprinting component for determining endpoint fingerprinting information for P2P client B 235. In some implementations, P2P client B 235 may include a P2P communications manager to mediate a P2P communication between two or more P2P clients in the absence of P2P server 220.

IoT device C 240 may include a device that is capable of receiving, processing, generating, determining, and/or providing information via an IoT network. For example, IoT device C 240 may include a computing device (e.g., a desktop computer, a laptop computer, a tablet computer, a handheld computer, a camera, an audio recorder, a camcorder, etc.), an appliance (e.g., a refrigerator, a microwave, a stove, etc.), a sensing device (e.g., a temperature sensor, a pressure sensor, an accelerometer, etc.), an actuating device, a processing device, a metering device, a machine-to-machine (M2M) device, a robotics device, a drone, a medical device, an automobile, a light bulb, and/or another type of device. In other words, IoT device C 240 may be any "thing" in the IoT network.

In some implementations, IoT device C 240 may include a communication interface that allows IoT device C 240 to receive information from and/or transmit information to P2P client B 235, P2P server 220, and/or another device, including other IoT devices C 240. In some implementations, IoT device C 240 may include P2P client C 245 and/or P2P server C 250.

P2P client C 245 may perform one or more functionalities of P2P client A 210 and/or P2P client B 235.

P2P server C 250 may perform one or more functionalities of P2P server 220.

The number and arrangement of devices and networks shown in FIGS. 2A-2B are provided as examples. In practice, there may be additional devices and/or networks, fewer devices and/or networks, different devices and/or networks, or differently arranged devices and/or networks than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) of environment 200 may perform one or more functions described as being performed by another set of devices of environment 200.

Figure 3:
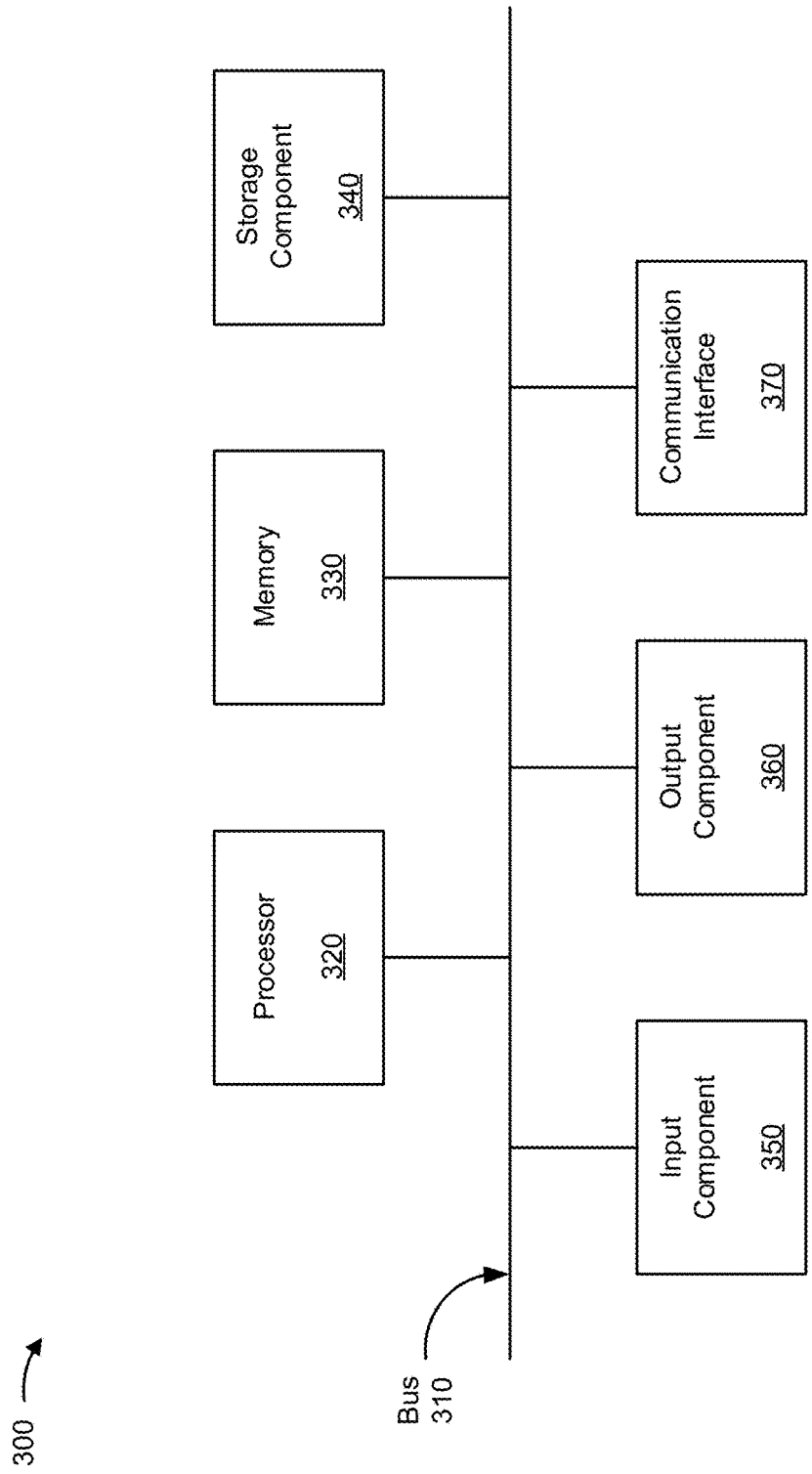
FIG. 3 is a diagram of example components of one or more devices of FIG. 2.

FIG. 3 is a diagram of example components of a device 300. Device 300 may correspond to IoT device A 205, P2P client A 210, P2P server 220, IoT device B 230, P2P client B 235, IoT device C 240, P2P client C 245, and P2P server C 250. In some implementations, IoT device A 205, P2P client A 210, P2P server 220, IoT device B 230, P2P client B 235, IoT device C 240, P2P client C 245, and/or P2P server C 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), an actuator, haptics, etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, an acoustic interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
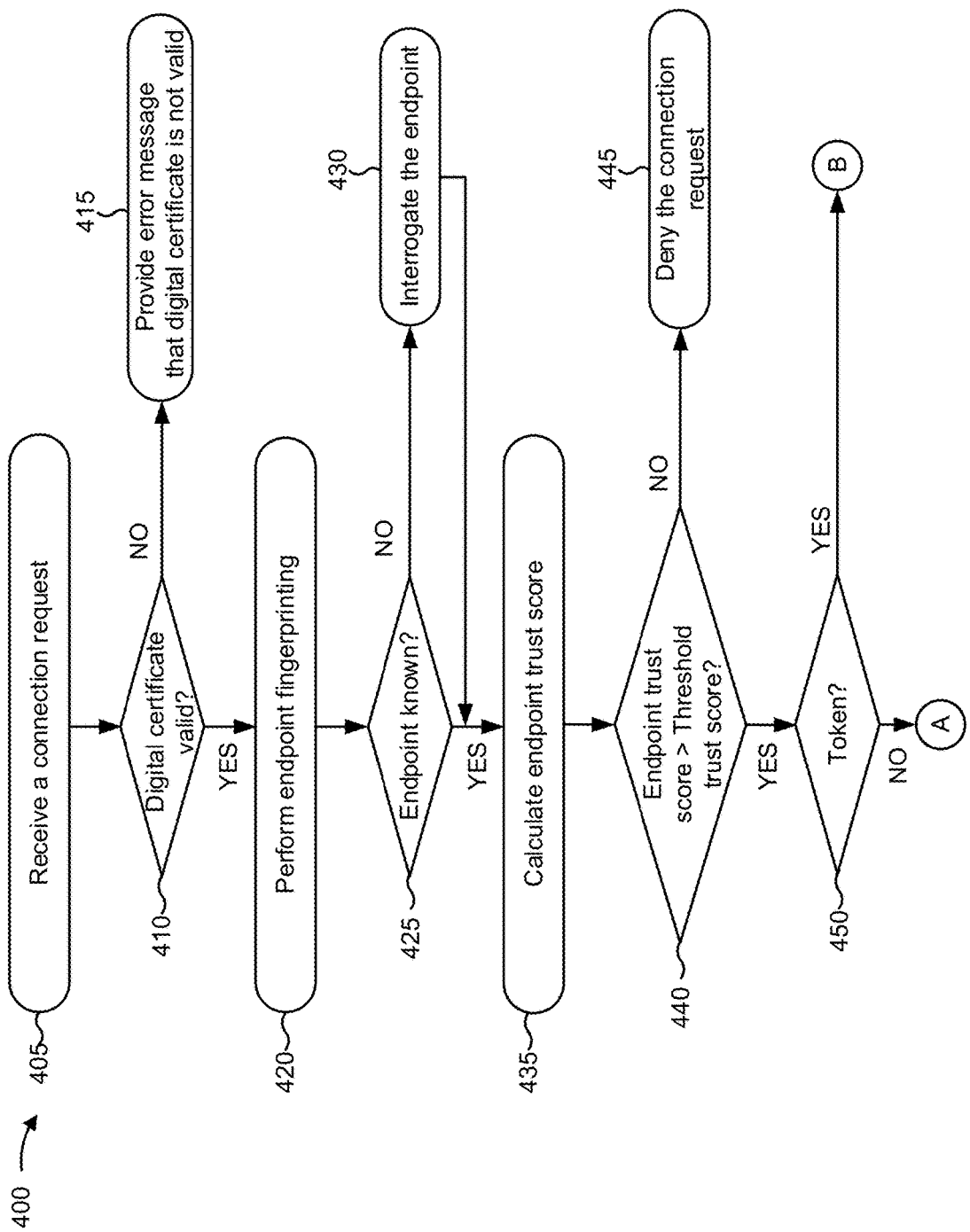
FIG. 4A-4B are flow charts of an example process for establishing an asynchronous P2P communication and data exchange between IoT devices.
Figure 4B:
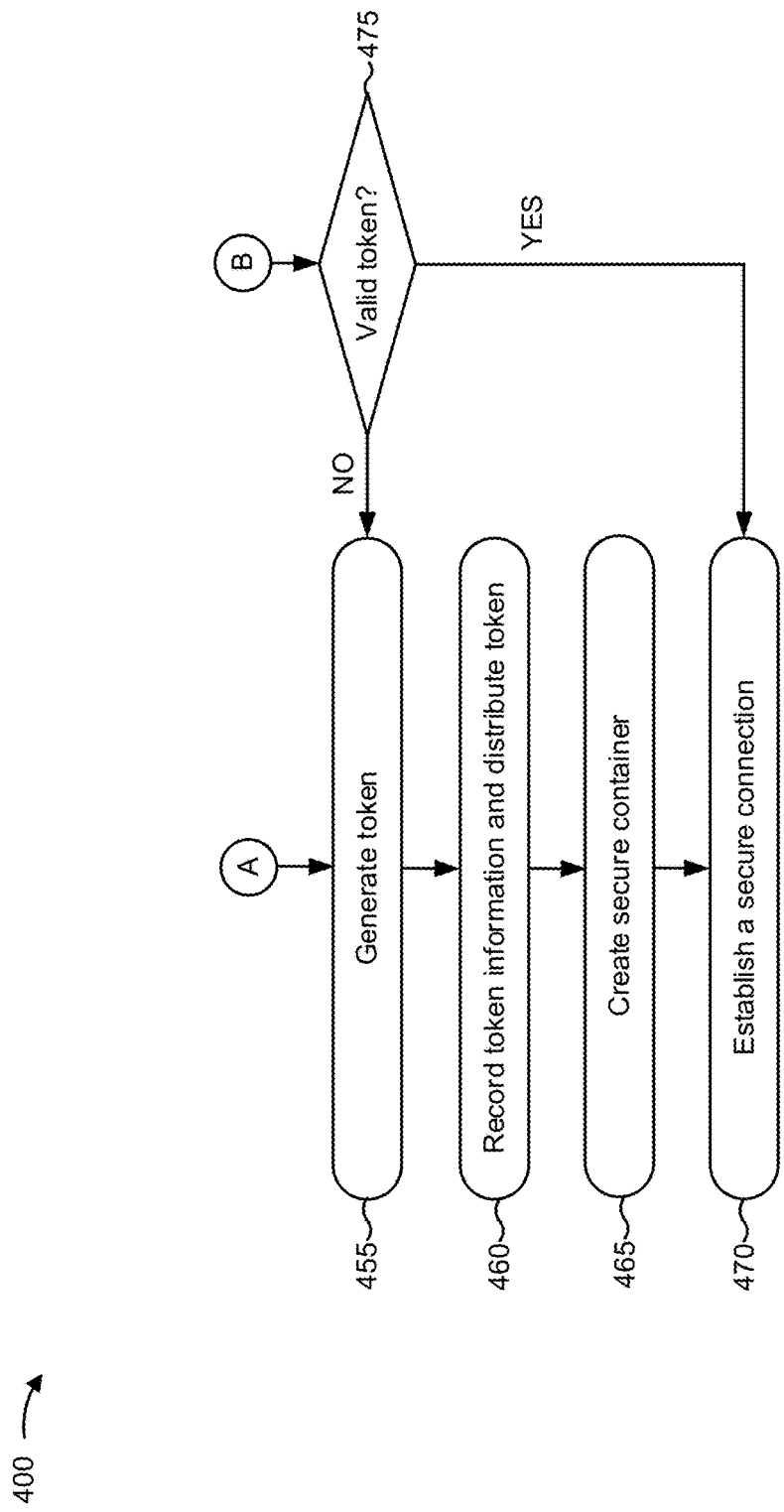

FIGS. 4A-4B are flow charts of an example process 400 for establishing an asynchronous P2P communication between IoT devices. In some implementations, one or more process blocks of FIGS. 4A-4B may be performed by P2P server 220. In some implementations, one or more process blocks of FIGS. 4A-4B may be performed by another device or a set of devices separate from or including P2P server 220, such as IoT device A 205, P2P client A 210, IoT device B 230, P2P client B 235, IoT devices C 240, P2P clients C 245, and/or P2P servers C 250.

As shown in FIG. 4A, process 400 may include receiving a connection request (block 405). For example, P2P server 220 may receive a connection request from an endpoint (e.g., P2P client A 210, P2P client B 235, and/or another device) to establish a secure connection for a P2P communication between P2P client A 210, P2P client B 235, and/or another device.

The connection request may include a digital certificate (e.g., an X.509 certificate) received by P2P client A 210, P2P client B 235, and/or another device (e.g., received during installation of P2P client A 210, P2P client B 235, and/or another device; received during a dynamic refresh of client software installed on P2P client A 210, P2P client B 235, and/or another device; etc.).

The connection request may also include endpoint fingerprint information for P2P client A 210, P2P client B 235, and/or another device. Endpoint fingerprint information may include device information. For example, device information may include an International Mobile Equipment Identifier (IMEI), a Mobile Station International Subscriber Directory Number (MSISDN), an International Mobile Subscriber Identity (IMSI), a Mobile Equipment Identifier (MEID), a Unique Device ID (UDID), a MAC Address, operating system information, a current screen size, a time zone, browser plug-in information, language settings, system fonts, cookies enabled information, graphics capabilities, software versions, or the like.

Endpoint fingerprint information may also, or alternatively, include network information. Network information may include an IP address, a location associated with the IP address, network-derived location information (e.g., a cell triangulation, A-GPS, etc.), an Access Point Name (APN), a connection type, a connection speed, a carrier name, an Autonomous System Number (ASN), information about connections to other IoT devices, or the like.

Endpoint fingerprint information may also, or alternatively, include clock skew information. Clock skew information may include a clock skew. Operation of most digital circuit systems, such as computer systems, is synchronized by a periodic signal known as a "clock" that dictates the sequence and pacing of devices in a digital circuit system. The clock is distributed from a single source to one or more memory devices in the digital circuit system, referred to as registers or flip-flops.

The clock skew refers to the clock arriving at different registers in the digital circuit system at different times. The clock skew may be a result of many factors (e.g., a wire-interconnect length, temperature variations, material imperfections, etc.). Clock skew information may include a type for the clock skew (i.e., a positive skew or a negative skew), a clock skew rate, clock skew violations, or the like.

The connection request may include context information for the endpoint. Context information may include a date for the connection request, a time for the connection request, a location from where the connection request was made, user-entered information, connections to other IoT devices, or the like.

As shown in FIG. 4A, process 400 may include determining whether a digital certificate is valid (block 410). For example, P2P server 220 may include identifying certificate information, including a digital certificate chain for P2P client A 210, P2P client B 235, and/or another device. P2P server 220 may read from particular fields of packets carrying the connection request to identify specific certificate information.

For example, P2P server 220 may serve as a trusted root with a trusted root certificate (e.g., CA-0), installed on P2P server 220. Additionally, or alternatively, P2P server 220 may receive a digital certificate from P2P client A 210, P2P client B 235, and/or another device, included in the connection request. Additionally, or alternatively, P2P server 220 may determine that the digital certificate received in the connection request was issued by P2P server 220 based on the digital certificate chain (e.g., the digital certificate chain for P2P client A 210 is CA0:CA1, where CA0 identifies the digital certificate installed on P2P server 220 as issuing the digital certificate CA-1; the digital certificate chain for P2P client B 235 is CA0:CA1a, where CA0 identifies the digital certificate installed on P2P server 220 as issuing the digital certificate CA1a; etc.). Additionally, or alternatively, P2P server 220 may determine that digital certificates issued by P2P server 220 are valid and, therefore, trusted.

In some implementations, P2P server 220 may receive a digital certificate (e.g., CA-1) from a third-party certificate authority, where the third-party certificate authority holds the trusted root certificate (e.g., CA-0). Additionally, or alternatively, P2P server 220 may receive authority form the third-party certificate authority to act as an intermediary CA and issue digital certificates to subordinate IoT devices (e.g., P2P server 220 may issue a digital certificate CA-2 to P2P client A 210, P2P server 220 may issue a digital certificate CA-2a to P2P client B 235, etc.).

During the connection request, P2P server 220 may receive a digital certificate, for example, from P2P client A 210 where the digital certificate chain for P2P client A 210 is CA0:CA1:CA2, from P2P client B 235 where the digital certificate chain for P2P client B 235 is CA0:CA1:CA2b, or the like. Additionally, or alternatively, P2P server 220 may determine that the digital certificate received in the connection request is valid based on the digital certificate chain identifying that P2P server 220 issued the digital certificate, and therefore, is valid.

In some implementations, P2P server 220 may be located in an IoT device (e.g., IoT device A 205, IoT device B 230, etc.). P2P server 220 may receive a digital certificate (e.g., CA-1a) from a third-party certificate authority, where the third-party certificate authority holds the trusted root certificate (e.g., CA-0).

During the connection request, P2P server 220 may receive a digital certificate, for example, from P2P client A 210 where the digital certificate for P2P client A 210 was issued by the third-party certificate authority (e.g., CA-0) and where the digital certificate chain for P2P client A 210 is CA0:CA1. Additionally, or alternatively, P2P server 220 may determine that the digital certificate received in the connection request is valid based on the digital certificate chain, included in the certificate information, identifying that the third-party authority issued the digital certificate. P2P server 220 may trust the third-party certificate authority as a source for issuing digital certificates since P2P server 220 includes a digital certificate (e.g., CA-1a) also issued by the same third-party authority (e.g., CA-0).

These are a few ways of determining whether a digital certificate is valid, and other ways are possible.

Additionally, or alternatively, P2P server 220 may identify other certificate information (e.g. a subject, a public key, a certificate serial number, a valid period of time for the digital certificate, etc.) other than the digital certificate chain. P2P server 220 may read from particular fields of packets carrying the connection request to identify the other certificate information.

P2P server 220 may compare the certificate information with stored certificate information of a corresponding type (e.g., a subject certificate may be compared with a stored subject certificate, a certificate serial number may be compared with a stored certificate serial number, a valid period of time for the certificate may be compared with a stored valid period of time, etc.).

If the certificate information matches the stored certificate information for all corresponding types, then the digital certificate is valid. If the certificate information does not match the stored certificate information for any corresponding type, then the digital certificate is not valid.

As shown in FIG. 4A, if the digital certificate is not valid (block 410-No), process 400 may include providing an error message that the digital certificate is not valid (block 415). For example, P2P server 220 may provide an error message indicating that the certificate is not valid. Additionally, or alternatively, P2P server 220 may provide the error message for display on P2P client A 210, P2P client B 235, and/or another device so that a user of P2P client A, P2P client B 235, and/or another device, respectively, may understand why P2P client A 210, P2P client B 235, and/or another device may not establish a secure connection for the P2P communication.

As shown in FIG. 4A, if the digital certificate is valid (block 410-Yes), process 400 may include performing endpoint fingerprinting (block 420). For example, P2P server 220 may include identifying endpoint fingerprint information included in the connection request. P2P server 220 may read from particular fields of packets carrying the connection request to identify specific endpoint fingerprint information. In some implementations, P2P server 220 may combine the specific endpoint fingerprint information to create an endpoint fingerprint associated with the IoT device attempting the connection request. This is one way of creating an endpoint fingerprint, and other ways are possible.

As shown in FIG. 4A, process 400 may include determining whether the endpoint is known (block 425). For example, P2P server 220 may compare the endpoint fingerprint information with stored endpoint fingerprint information. If the endpoint fingerprint information matches stored endpoint fingerprint information, then the endpoint is known. If the endpoint fingerprint information does not match the stored endpoint fingerprint information, then the endpoint is not known.

In some implementations, P2P server 220 may compare the endpoint fingerprint with a stored endpoint fingerprint. If the endpoint fingerprint matches the stored endpoint fingerprint, then the endpoint is known. If the endpoint fingerprint does not match the stored endpoint fingerprint, then the endpoint is not known.

As shown in FIG. 4A, if the endpoint is not known (block 425-No), process 400 may include interrogating the endpoint (block 430). For example, P2P server 220 may continue to read from particular fields of packets carrying the connection request to identify additional endpoint fingerprint information. In some implementations, P2P server 220 may request additional endpoint fingerprint information from P2P client A 210, P2P client B 235, and/or another device.

As shown in FIG. 4A, if the endpoint is known (block 425-Yes), process 400 may include calculating an endpoint trust score (block 435). For example, P2P server 220 may select specific endpoint information for evaluating the endpoint trust score (may be referred to as trust factors) (e.g., device information, network information, clock skew, token information, communications history, etc.). Additionally, or alternatively, P2P server 220 may determine the endpoint trust score based on evaluation of the specific endpoint information.

In some implementations, P2P server 220 may determine the endpoint trust score by rating a strength of the trust factor (e.g., a strong, an average, or a weak score, a numerical score, etc.). For example, trust factors may be assigned a level of importance (e.g., device information may be assigned as the most important trust factor, network information may be assigned the second most important trust factor, clock skew information may be assigned as the third most important trust factor, etc.).

Additionally, and/or alternatively, specific endpoint fingerprint information may be weighted based on the assigned level of importance, where the most important trust factor may receive a higher weighting than a less important trust factor (e.g., device information may be determined as the most important trust factor and given a weight of 50%, network information may be determined as a trust factor of lesser importance and assigned a weight of 35%, clock skew information may be determined as a trust factor of even lesser importance and may be assigned a weight of 15%, etc.).

Additionally, and/or alternatively, a total weight amount for all the trust factors selected for evaluating the endpoint trust score may equal 100%. A specific trust factor may receive a point value (e.g., 2 points for a trust factor detected; 3 points for a trust factor detected; 5 points for a trust factor detected, etc.). The point value (e.g., 5 points) for a trust factor detected is multiplied by the weight given to the specific trust factor to obtain an individual endpoint trust score.

For example, P2P server 220 identifies and selects device information (e.g., a MAC address and a time zone), network information (e.g., an IP address), and clock skew information (e.g., a clock skew rate) as the trust factors for evaluating the endpoint trust score for P2P client B 235. P2P server 220 assigns a point value to a trust factor (e.g., 5 points for identifying the MAC address, 5 points for identifying the time zone, 5 points for identifying the IP address, 5 points for identifying the clock skew rate, etc.). P2P server 220 may multiply the point value for a trust factor by the weight given to the trust factor (e.g., the device information may receive a score of 5 (10 points×0.5), the network information may receive a score of 1.75 (5 points×0.35), the clock skew information may receive a score of 0.75 (5 points×0.15), etc.).

In some implementations, multiple trust factors may have the same level of importance and may receive the same weighting. In some implementations, different trust factors within a category of endpoint fingerprint information (e.g., device information) may receive the same weighting (e.g., the MAC address and time zone may receive a 50% weighting) or different weighting (e.g., a MAC address may receive a 50% weighting while a time zone may receive a 10% weighting). In some implementations, different trust factors within a category of endpoint fingerprint information may receive a same point value (e.g., the MAC address as a trust factor may receive 5 points, the time zone as a trust factor may receive 5 points) or a different point value (e.g., the MAC address as a trust factor may receive 5 points while the time zone as a trust factor may receive 2 points).

In some implementations, an endpoint trust score may be a sum of the individual endpoint trust scores received for a trust factor (e.g., the endpoint trust score=7.5 for P2P client B 235 where P2P server 220 assigns a weight of 50% and a point value of 5 for trust factors relating to device information (the MAC address and the time zone), assigns a weight of 35% and a point value of 5 for trust factors relating to network information (the IP address), and assigns a weight of 10% and a point value of 5 for trust factors relating to clock skew information (the clock skew rate). This is one way of calculating the endpoint trust score and other ways may be possible.

Additionally, or alternatively, P2P server 220 may store the endpoint trust score. In some implementations, P2P server 220 may adjust the P2P endpoint trust score based on positive and/or negative P2P communications (e.g., by utilizing machine-learning). For example, the endpoint trust score may increase (e.g., increase by 1 point, increase by 2 points, increase by 3 points, etc.) for a positive P2P communication with the same IoT device (e.g., P2P client A 210, P2P client B 235, etc.). In some implementations, the endpoint trust score may decrease (e.g., decrease by 1 point, decrease by 2 points, decrease by 3 points, etc.) for a negative P2P communication with the same device (e.g., P2P client A 210, P2P client B 235, etc.).

As shown in FIG. 4A, process 400 may include determining whether the endpoint trust score is greater than a threshold trust score (block 440). For example, P2P server 220 may obtain a threshold trust score. The threshold trust score may be input by an operator of P2P server 220 and/or determined automatically. For example, P2P server 220 may automatically select the lowest endpoint trust score for an endpoint that proved trustworthy and decrease the lowest endpoint trust score by a quantity to determine the threshold trust score (e.g., decreasing the lowest endpoint trust score of '6' for an IoT device determined as trustworthy by 1 to determine the threshold trust score=5). This is one way of automatically obtaining the threshold trust score and other ways may be possible.

As shown in FIG. 4A, if the endpoint trust score is not greater the threshold trust score (block 440-No), process 400 may include denying the connection request (block 445). For example, P2P server 220 may deny the connection request received from P2P client A 210, P2P client B 235, and/or another device to establish a secure P2P connection.

Additionally, or alternatively, P2P server 220 may notify P2P client A 210, P2P client B 235, and/or another device that the connection request is denied. The notification may indicate a reason that the connection request is denied (e.g., "Trust failure"). P2P client A 210, P2P client B 235, a user device associated with P2P server 220, and/or another device may provide the notification for display so that a user of P2P client A 210, P2P client B 235, a user device associated with P2P server 220, and/or another device may understand why the connection request is being denied.

As shown in FIG. 4A, if the endpoint trust score is greater than the threshold trust score (block 440-Yes), process 400 may include determining whether there is a token (block 450). For example, P2P server 220 may determine whether token information is included in the connection request. P2P server 220 may read from particular fields of packets carrying the connection request to identify the token information for the endpoint. If there is no token information included in the connection request, P2P server 220 may determine there is no token. If there is token information included in the connection request, P2P server may determine there is a token.

As shown in FIG. 4A, if there is no token (block 450-No), process 400 may include generating a token (FIG. 4B) (block 455). For example, P2P server 220 may generate a token by creating a code (e.g., a numeric code, an alphanumeric code, an alphabet code, etc.). Security for the token may be increased by adding length to the code (e.g., a token with 15 digits may be more secure than a token with 10 digits). Additionally, or alternatively, security for the token may be increased by including a checksum value within the code. In some implementations, P2P server 220 may generate the token randomly.

In some implementations, P2P server 220 may use the endpoint information to provide a robust and information-rich token (e.g., including a MAC ID in the code, including a time-to-live in the code, including a network address in the code, etc.).

Additionally, or alternatively, P2P server 220 may calculate a time-to-live for the token. The time-to-live provides a validity period for the token (e.g., a time-to-live=1 hour from a time the secure connection is established, a time-to-live=24 hours from a time the secure connection is established, a time-to-live=48 hours from a time the secure connection is established, etc.). P2P server 220 may consider the endpoint information to determine the time-to-live. Additionally, or alternatively, P2P server 220 may consider historical token information (e.g., token information for any token previously generated) to determine the time-to-live (e.g., calculating a same time-to-live=1 hour for P2P client B 235 with a MAC address identifying a vendor where P2P server 220 provided a token with the same time-to-live=1 hour for one or more devices with MAC addresses identifying the same vendor).

As shown in FIG. 4B, process 400 may include recording token information and distributing the token (block 460). For example, P2P server 220 may record the token by storing the token information in a memory device (e.g., memory 330, storage component 340, etc.) or a collection of memory devices accessible by P2P server 220. Additionally, or alternatively, P2P server 220 may record endpoint token accounting information (e.g., endpoint token accounting information=CA0(T0):CA1(T1):CA2(T2):CA3(T3) where T0, T1, T2, and T3 are token identifiers for tokens associated with respective digital certificates).

Additionally, or alternatively, P2P server 220 may distribute the token by sending the token to P2P client A 210, P2P client B 235, and/or another device.

In some implementations, P2P server 220 may revoke a token, extend the time-to-live for the token, and/or renew the token. In some implementations, once the token has expired or has been revoked, the token may be "flushed" (or deleted) and the token may not be used again. The distributed token may be securely stored in a secure area (e.g., similar to the secure area available on a mobile device Subscriber Identity Module (SIM)). In some implementations, P2P server 220 may revoke the token, extend the time-to-live for the token, and/or renew the token automatically based on stored endpoint information and/or token information. In some implementations, a user of P2P server 220 may revoke the token, extend the time-to-live for the token, and/or renew the token.

As shown in FIG. 4B, process 400 may include providing instructions to create a secure container (block 465). For example, P2P server 220 may provide instructions to P2P client A 210, P2P client B 235, and/or another device to create a secure container by using virtualization and isolation techniques (e.g., by using Linux Containers or LXCs, Docker, etc.). P2P server 220 may use the secure containers for receiving, managing, and/or storing information in an isolated manner, such as P2P communications between two or more P2P clients.

Additionally, or alternatively, P2P server 220 may provide instructions for accounting for the P2P communication (e.g., stored in the secure container), including artifacts relating to the data, and transaction details related to the P2P communication.

Additionally, or alternatively, P2P server 220 may provide instructions to flush the secure containers, including the transaction details associated with the P2P communication and/or data exchange. P2P server 220 may provide instructions to flush the secure containers automatically based on events including user action, expiration of time-to-live token, initiation of a deletion commanded from P2P server 220, P2P client A 210, P2P client B 235, and/or another device. The ability to flush the secure containers may be beneficial for P2P communications seeking anonymity and/or to address privacy concerns about storing data long-term.

In some implementations, P2P server 220 may provide instructions for the secure container to store data exchanged that may not be trusted or may be verified further. For example, P2P server 220 may allow data to be exchanged from P2P client A 210, P2P client B 235, and/or another device that could not be verified or fully trusted (e.g., based on a low endpoint trust score). P2P server 220 may choose to verify security of the data exchanged (e.g., by re-verifying the validity of the token, performing a virus checking on content of the data exchanged, etc.).

In some implementations, block 465 may occur prior to block 460 or even earlier in process 400.

As shown in FIG. 4B, process 400 may include establishing a secure connection (block 470). For example, P2P server 220 may establish a secure connection between P2P client A 210 and P2P client B 235 for the P2P communication. P2P server 220 may provide P2P client A 210 and/or P2P client B 235 to leverage the secure connection for various P2P communications (e.g., file sharing, video messaging, audio messaging, screen sharing, co-browsing, adding additional layer(s) of security to real-time P2P communications, etc.).

As shown in FIG. 4A, if there is a token (block 450-Yes), process 400 may include determining whether the token is valid (FIG. 4B) (block 475). For example, P2P server 220 may determine token information for the token included in the connection request.

Additionally, or alternatively, P2P server 220 may compare the token information with stored token information of a corresponding type (e.g., source information may be compared with stored source information, a security level may be compared with a stored security level, a time-to-live may be compared with a stored time-to-live, etc.). If the token information matches all the stored token information with a corresponding type, then the token is valid. If the token information does not match the stored token information for a corresponding type (or any corresponding type), then the token is valid.

As shown in FIG. 4B, if the token is valid (block 475-Yes), process 400 may include establishing a secure connection by looping back to block 470.

As shown in FIG. 4B, if the token is not valid (block 475-No), process 400 may include generating a token by looping back to block 455.

Although FIGS. 4A-4B shows example blocks of process 400, in some implementations, process 400 may include additional blocks, fewer blocks, different blocks, or differently arranged blocks than those depicted in FIGS. 4A-4B. Additionally, or alternatively, two or more of the blocks of process 400 may be performed in parallel.

FIGS. 5A-5F are diagrams of an example implementation 500 relating to example process 400 shown in FIGS. 4A-4B. FIGS. 5A-5F show an example of establishing an asynchronous P2P communication between IoT devices.

Figure 5A:
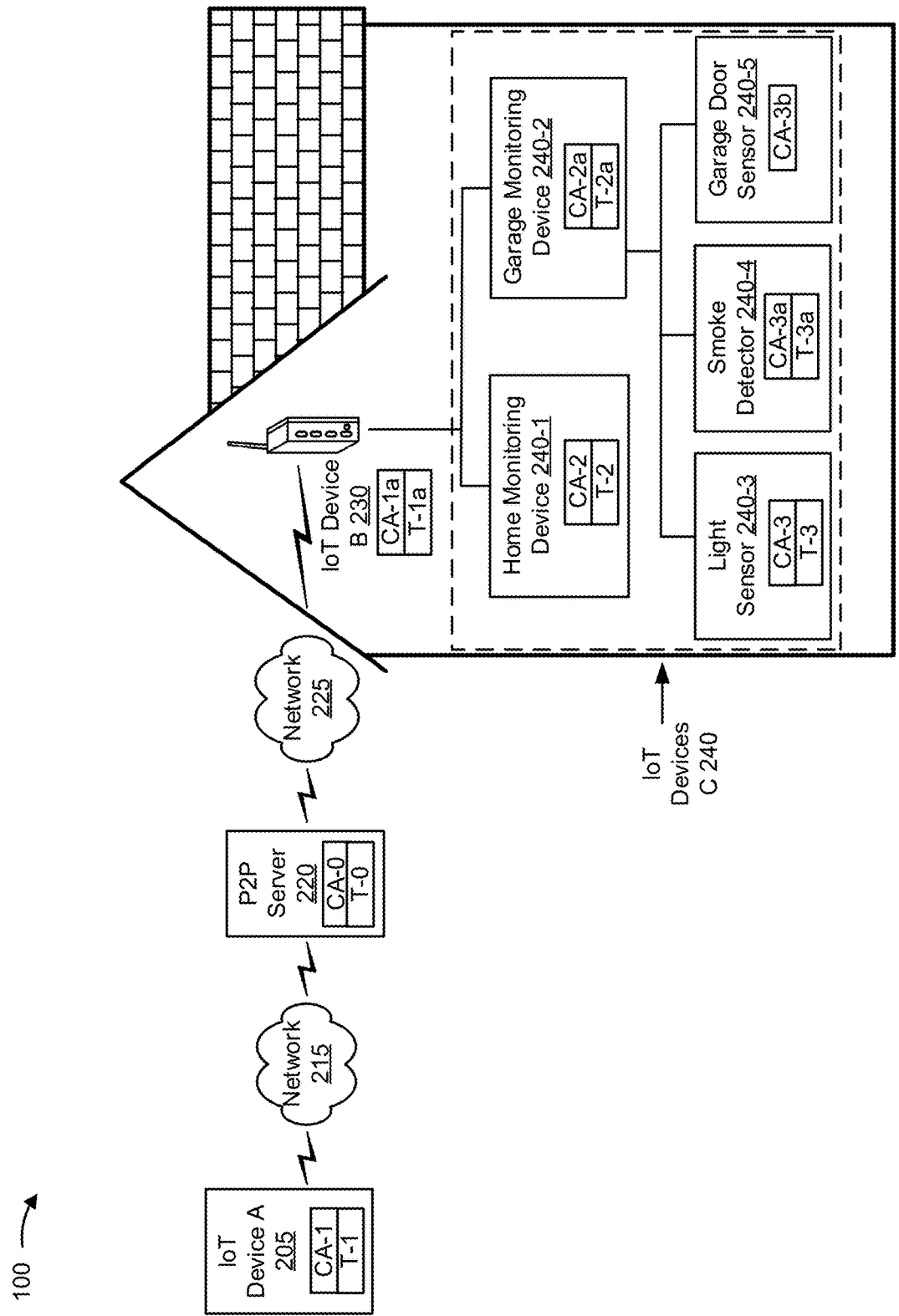

As shown in FIG. 5A, assume IoT device A 205 is a home security and management (HSM) server device associated with a HSM network (not shown) that provides a variety of services, such as home security, home automation, home health care, or the like, for a user at a location (e.g., a home). IoT device A 205 provides information to and receives information from IoT devices C 240 (e.g., a garage monitoring device, a home monitoring device, etc.), via IoT Device B 230 (e.g., a BHR), using a P2P communication. IoT devices C 240 may also communicate with one or more IoT devices C 240.

Each of IoT devices C 240 includes a P2P client C 245 and a P2P server C 250. IoT devices C 240 include digital certificates (e.g., a digital certificate CA-0 installed on P2P server 220, a digital certificate CA-1a installed on IoT device B 230, a digital certificate CA-2a installed on IoT device C 240-2, etc.). IoT devices C 240 may include tokens received to establish a connection for a P2P communication and associated with the digital certificates (e.g., P2P server 220 includes a token T-0 associated with the digital certificate CA-0; IoT device B 230 includes a token T-1a associated with the digital certificate CA-1a; IoT device C 240-2 includes a token T-2a associated with the digital certificate CA-2a; etc.).

As shown by FIG. 5B, and by reference number 505, P2P server C 250-2 (not shown), included in IoT device C 240-2 (e.g., the garage monitoring device), receives a connection request for a P2P communication for the first time from IoT device C 240-5 (e.g., the garage door sensor). The connection request includes endpoint information (i.e., the digital certificate, including the certificate information, endpoint fingerprint information, and context information). The certificate information includes a digital certificate chain for IoT device C 240-5 (e.g., CA0:CA1a:CA2a:CA3b). The connection request may include token information, if any, for a previously issued token distributed to IoT device C 240-5 to establish a connection. Since IoT device C 240-5 is attempting the connection request for the first time, there is no token and associated token information provided in the connection request.

Figure 5C:
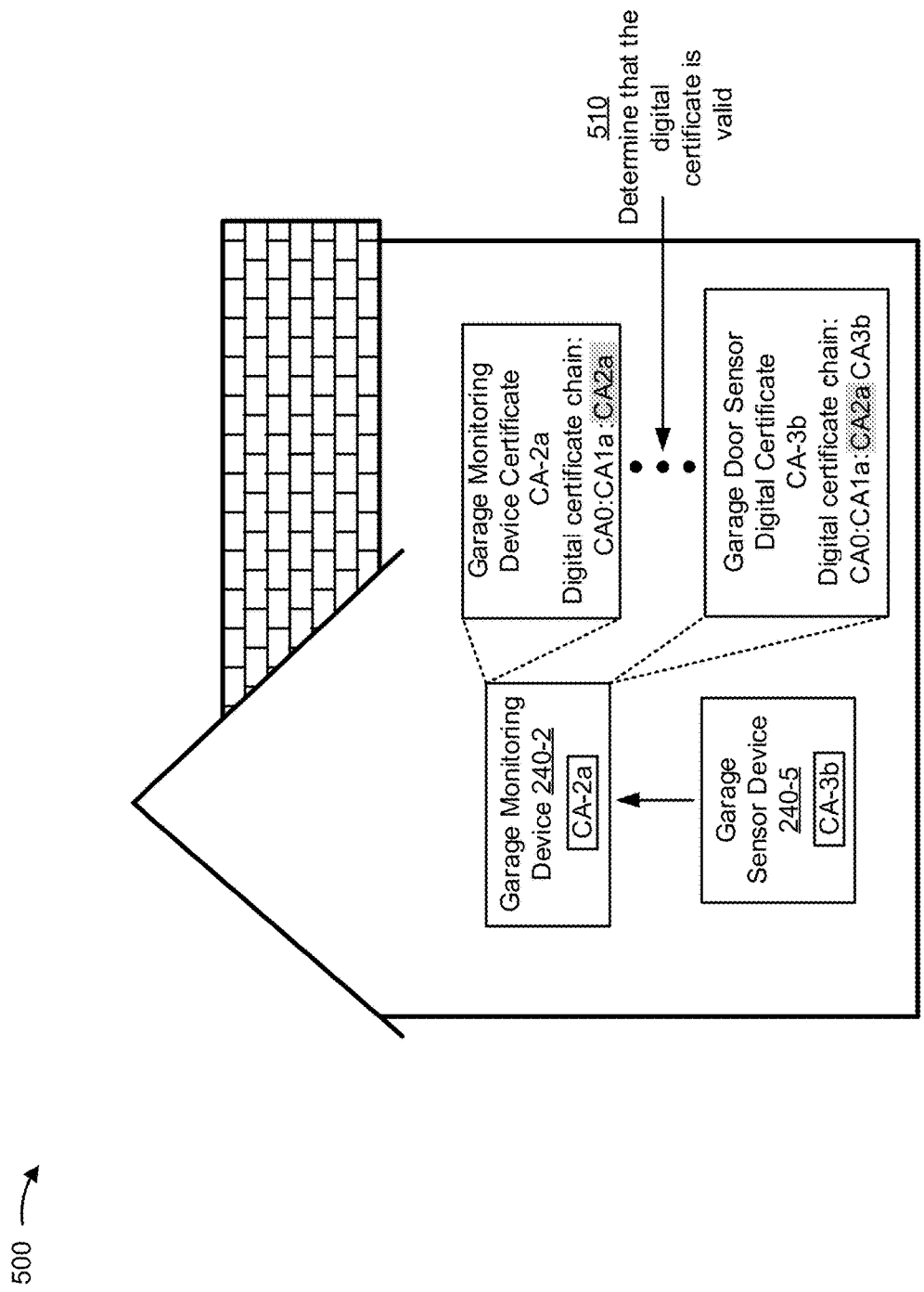

As shown in FIG. 5C, assume that P2P server C 250-2 determines that digital certificates issued by P2P server C 250-2 are valid. As shown in FIG. 5C, and by reference number 510, P2P server C 250-2 analyzes the digital certificate chain for IoT device C 240-5 (e.g., CA0:CA1a:CA2a:CA3b), included in the certificate information, and determines that P2P server C 250-2 issued the digital certificate for IoT device C 240-5 (e.g., based on the inclusion of CA-2a in the digital certificate chain for IoT device C 240-5). Therefore, P2P server C 250-2 determines that the digital certificate received from IoT device C is valid.

Figure 5D:
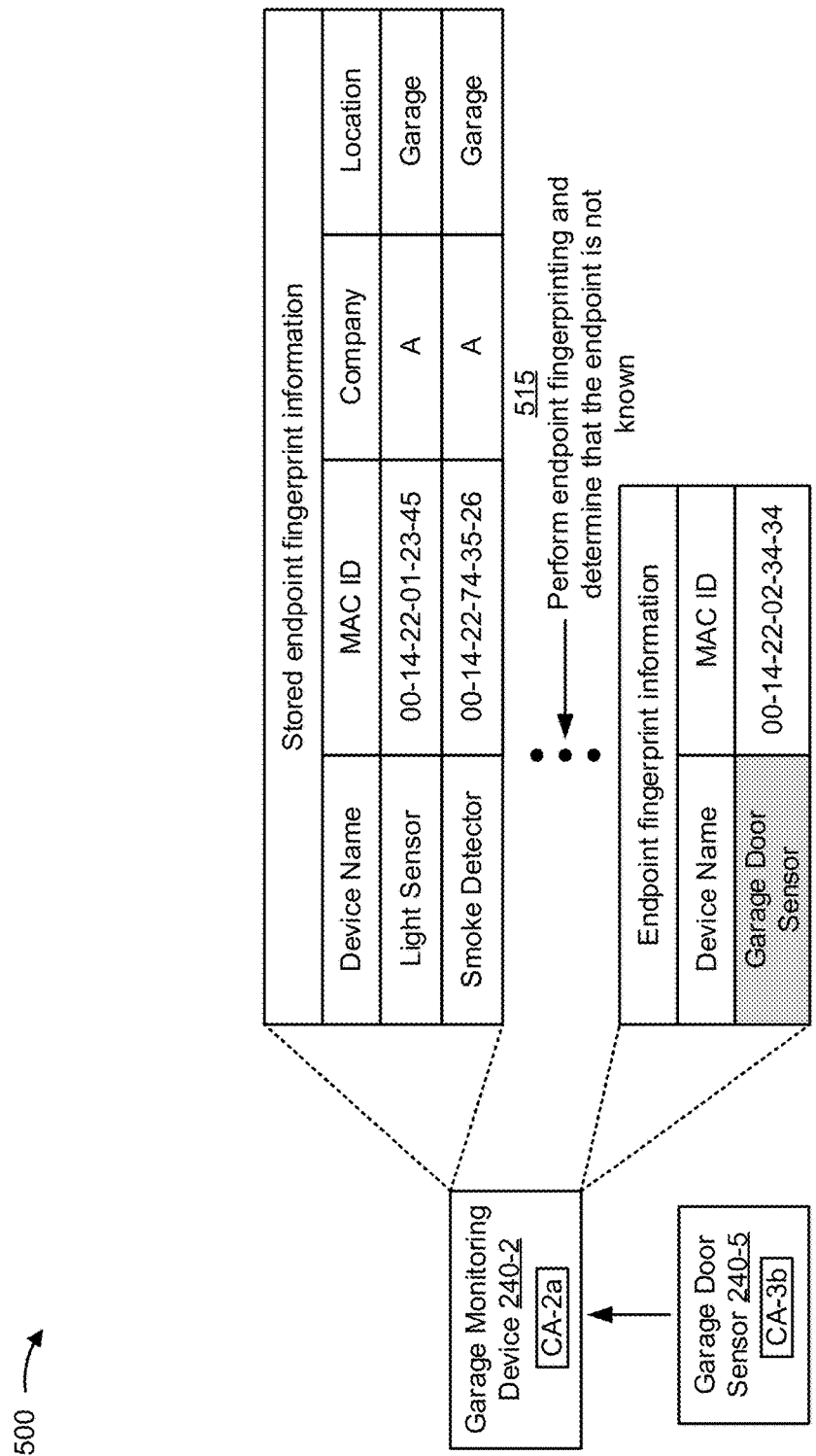

As shown in FIG. 5D, assume that P2P server C 250-2 stores endpoint fingerprint information (e.g., a MAC ID), determined from the endpoint fingerprint information for IoT device C 240-3 (e.g., a light sensor) and for IoT device C 240-4 (e.g., a smoke detector). As shown in FIG. 5D, and by reference number 515, P2P server C 250-2 performs endpoint fingerprinting for IoT device C 240-5. As shown in FIG. 5D, and by reference number 515, P2P server C 250-2 may compare the endpoint finger print information for IoT device C 240-5 (e.g., MAC ID=00-14-22-02-34-34) with the stored endpoint fingerprint information (e.g., MAC ID=00-14-22-01-23-45 for IoT device C 240-3, MAC ID=00-14-22-74-35-26, etc.) and determine that IoT device C 240-5 as an endpoint is not known since the endpoint fingerprint information did not match the stored endpoint fingerprint information.

Figure 5E:
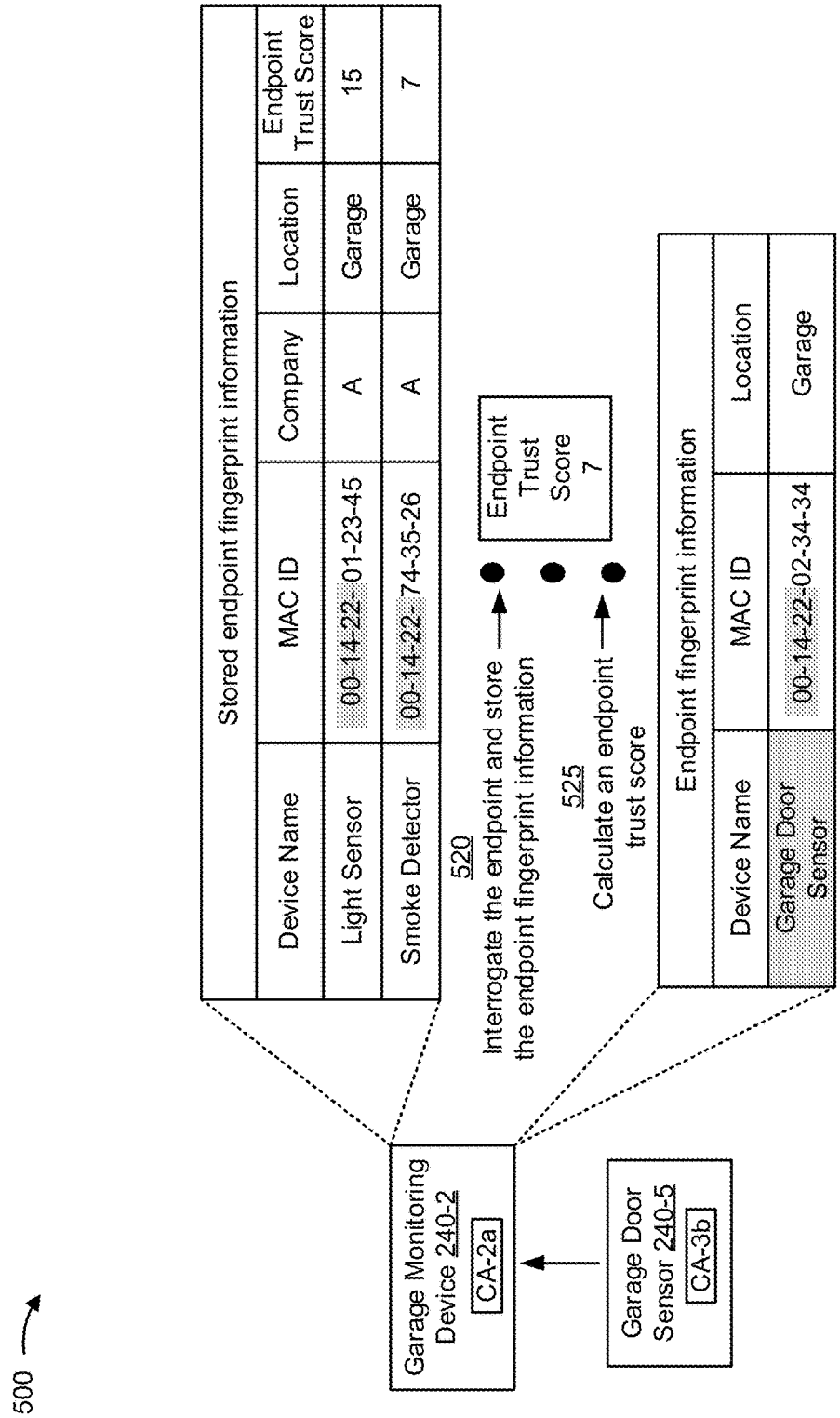

As shown by FIG. 5E, and by reference number 520, P2P server C 250-2 interrogates IoT device C 240-5 to obtain additional endpoint fingerprint information and identify the endpoint (e.g., device information, network information, clock skew information, etc.) for IoT device C 240-5.

As shown by FIG. 5E, and by reference number 525, P2P server C 250-2 calculates a trust score. For example, P2P server C 250-2 analyzes the MAC ID for IoT device C 240-5 and determines that the first six digits of the MAC ID match a known vendor identifier (e.g., IoT device C 240-3, IoT device C 240-4, and IoT device C 240-5 have MAC IDs that begin with '00-14-22,' identifying IoT devices sold by Company A). Further, network information for IoT device C 240-5 indicates that the IoT device was installed at a same location as IoT device C 240-3 and IoT device C 240-4 (e.g., a network address indicates that IoT device C 240-5 was installed in a garage, the same location as installation for IoT device C 240-3 and IoT device C 240-4).

As shown in FIG. 5E, assume IoT device C 240-3 and IoT device C 240-4 received an original calculated endpoint trust scores=6. Assume after multiple positive P2P communications, IoT device C 240-3 and IoT device C 240-4 increased their endpoint trust scores to 15 and 7, respectively. Assume P2P server C 250-2 determines that an endpoint attempting a connection request for a first time, sold by a common vendor and attempting a connection request from a known location as other trusted endpoints, may receive the lowest endpoint trust score calculated for the trusted endpoints.

As shown in FIG. 5E, P2P server C 250-2 calculates the same endpoint trust score=7 for IoT device C 240-5 as IoT device C 240-4 because IoT device C 240-4 is a trusted endpoint (e.g., IoT device C 240-4 previously received an endpoint trust scores >a threshold trust score; IoT device C 240-5 was sold by a common vendor, Company A, as IoT device C 240-4; IoT device C 240-5 was attempting a connection request from a known location, the garage where IoT device C 240-4 previously established a P2P communication).

Figure 5F:
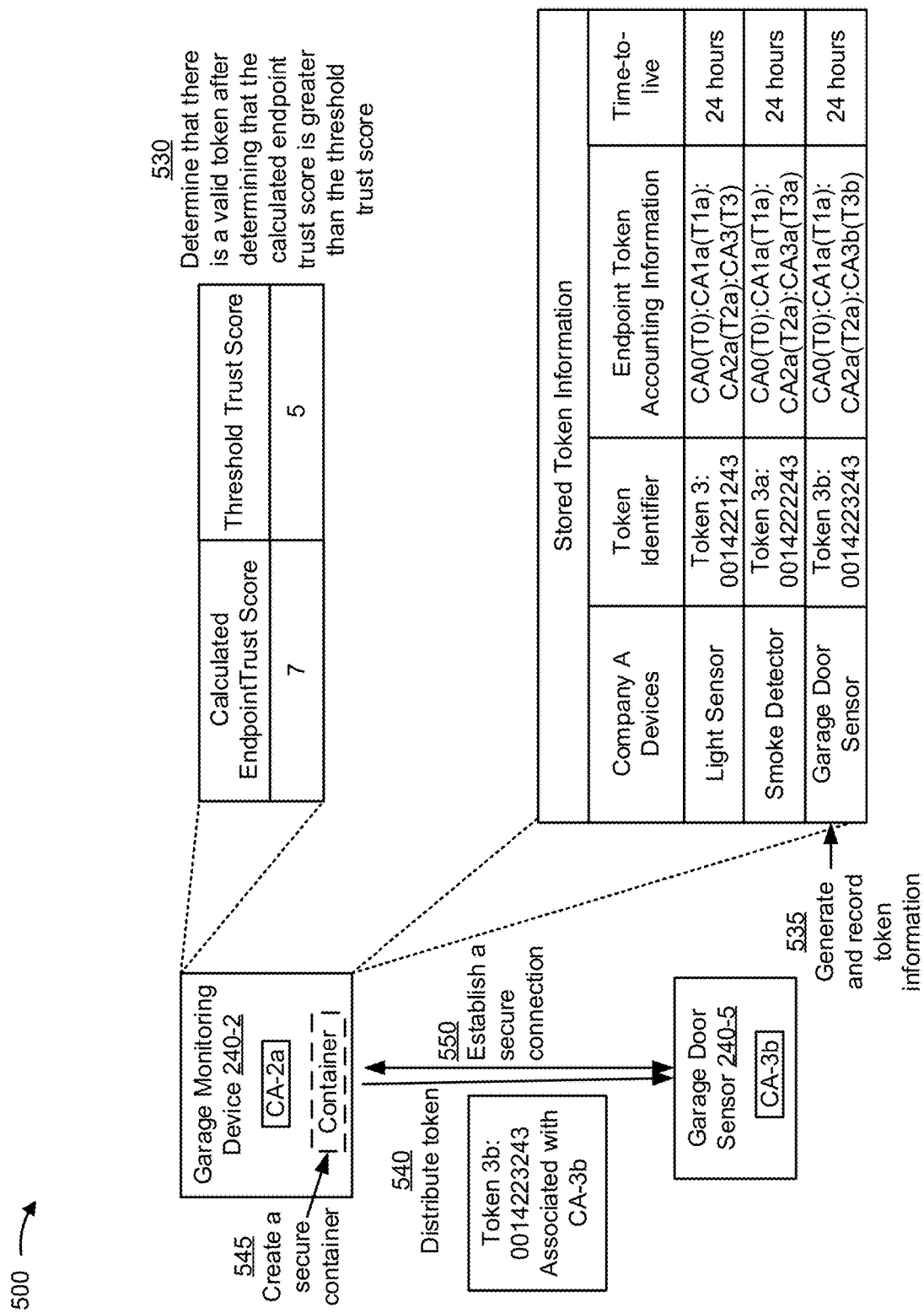

As shown in FIG. 5F, assume that P2P server C 250-2 obtained a threshold trust score (e.g. a threshold trust score=5). As show in FIG. 5F, and shown by reference number 530, since the endpoint trust score is greater than the threshold trust score, P2P server C 250-2 determines whether there is a token (e.g., the endpoint trust score=7>the threshold trust score=5). As shown in FIG. 5F, and shown by reference number 530, P2P server C 250-2 determines that there is no token, and therefore no valid token, since there is no token information provided in the connection request and also because IoT device C 240-5 is attempting a connection request for the first time.

As shown in FIG. 5F, and by reference number 535, P2P server C 250-2 may generate and record a token (e.g. Token 3*b* has a token identifier=0014223243) for the P2P communication between IoT device C 240-2 and IoT device C 240-5. P2P server A 220 may calculate a time-to-live (e.g., providing the same time-to-live of 24 hours as other IoT devices sold by Company A). The generated token includes a robust and data-rich code, including token information (e.g., Token b3=0014223243, where the first six digits, '001422,' is the vendor identifier, where the seventh digit, '3,' indicates that IoT device C 240-5 is the third IoT device installed in the user's home sold by Company A, and where the last three digits, '243,' indicate a time-to-live of 24 hours, where the final digit '3' represents hours).

P2P server C 250-2 may record the token information (e.g., the token identifier='0014223243,' endpoint token accounting information=CA0(T0):CA1*a*(T1):CA2*a*(T2); CA3*b*(T1), a time the token was generated, a date the token was distributed, etc.). As shown in FIG. 5F, and by reference number 540, P2P server C 250-2 may distribute the token to IoT device C 240-5.

As shown in FIG. 5F, and by reference number 545, P2P client C 245-2 may provide instructions to P2P server C 250-2 (not shown) that is included in IoT device C 240-2, P2P client C 245-5 (not shown) that is included in IoT device C 240-5, and/or another device to create a secure container to receive the P2P communication.

As shown in FIG. 5F, and by reference number 550, P2P server C 250-2 may establish a connection for the P2P communication.

As indicated above, FIGS. 5A-5F are provided merely as an example. Other examples are possible and may differ from what was described with regard to FIGS. 5A-5F.

FIGS. 6A-6D are diagrams of an example implementation 600 relating to example process 400 shown in FIGS. 4A-4B. FIGS. 6A-6D show an example of establishing a second asynchronous P2P communication between IoT devices.

Figure 6A:
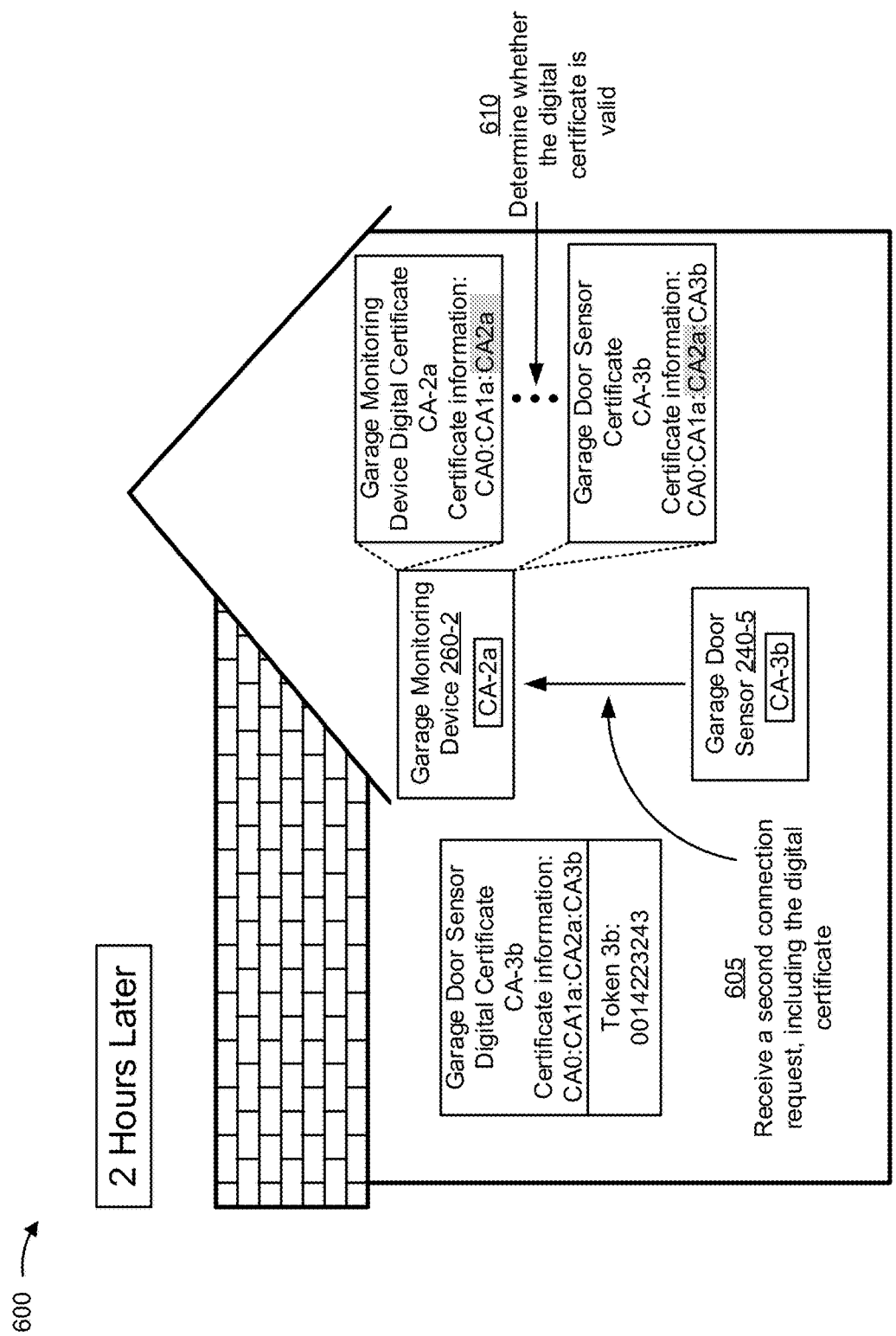
FIGS. 6A-6D are further diagrams of an example implementation relating to the example process shown in FIGS. 4A-4B.

As shown by FIG. 6A, assume two hours have passed from the time of the first connection request (as described with respect to FIGS. 5A-5F). As shown by FIG. 6A, and by reference number 605, P2P server C 250-2 (not shown), included in IoT device C 240-2 receives a second connection request for a P2P communication from IoT device C 240-5. The connection request includes endpoint information (i.e., the digital certificate, including the certificate information, endpoint fingerprint information, and context information). The certificate information includes a digital certificate chain for IoT device C 240-5 (e.g., CA0:CA1*a*:CA2*a*: CA3*b*). The connection request includes token information for the previously distributed token (e.g., Token 3=0014223243).

As shown in FIG. 6A, and by reference number 610, P2P server C 250-2 analyzes the digital certificate chain for IoT device C 240-5 (e.g., CA0:CA1*a*:CA2*a*:CA3*b*), included in the certificate information, and determines that P2P server C 250-2 issued the digital certificate for IoT device C 240-5 (e.g., based on the inclusion of CA-2*a* in the digital certificate chain for IoT device C 240-5). Additionally, or alternatively, P2P server C 250-2 determines that the digital certificate received from IoT device C is valid since P2P server C 250-2 issued the digital certificate for IoT device C 240-5.

Figure 6B:
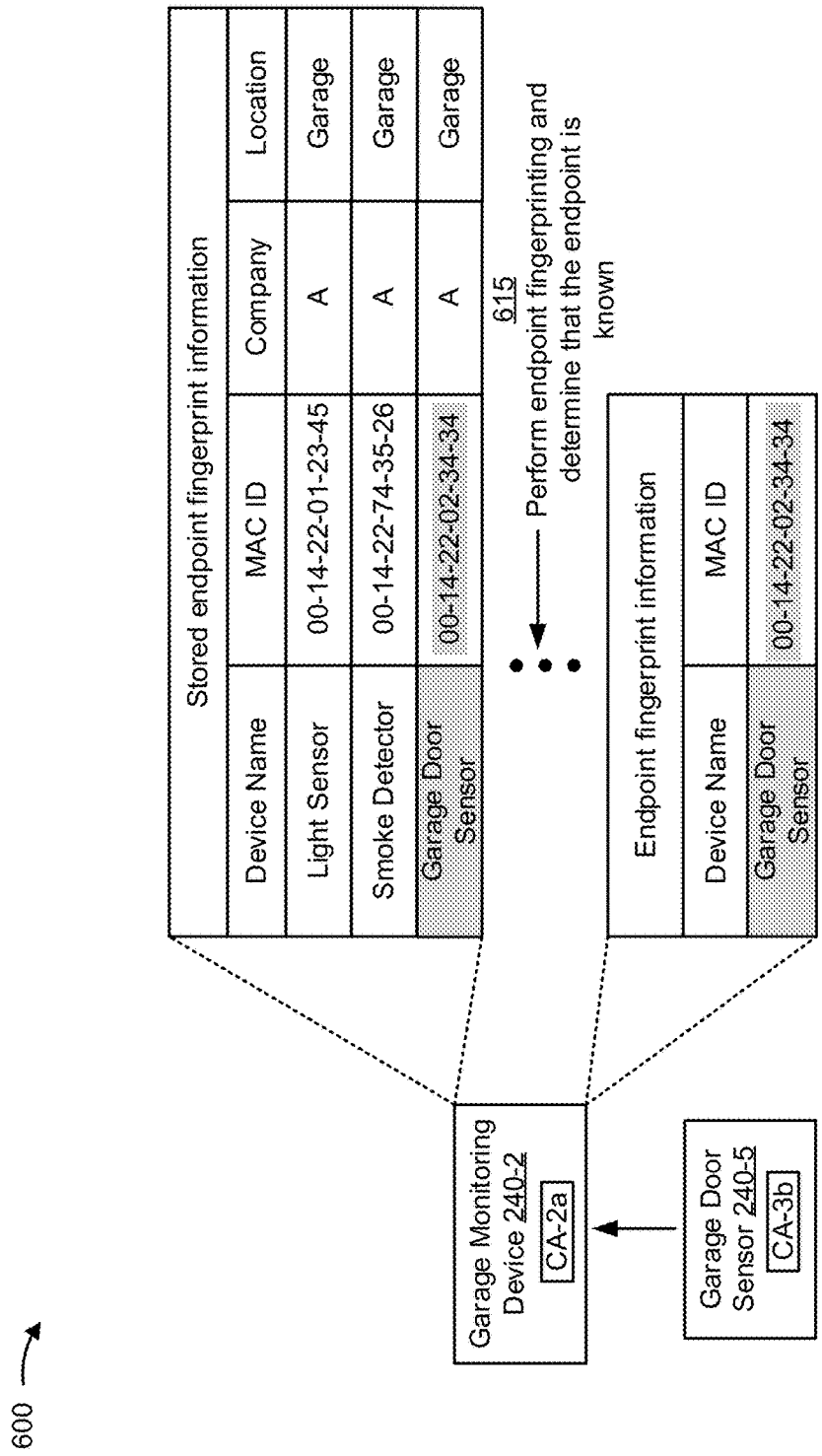

As shown in FIG. 6B, assume that P2P server C 250-2 stored the endpoint fingerprint association for IoT device C 240-5 during the first connection request. As shown in FIG. 6B, and by reference number 615, P2P server C 250-2 performs endpoint fingerprinting to determine the device information for IoT device C 240-5. As shown in FIG. 6B, and by reference number 615, P2P server C 250-2 compares the endpoint fingerprint information for IoT device C 240-5 (e.g., MAC ID=00-14-22-02-34-34) with the stored endpoint fingerprint information (e.g. MAC ID=00-14-22-02-34-34) and determine that IoT device C 240-5 is known.

Figure 6C:
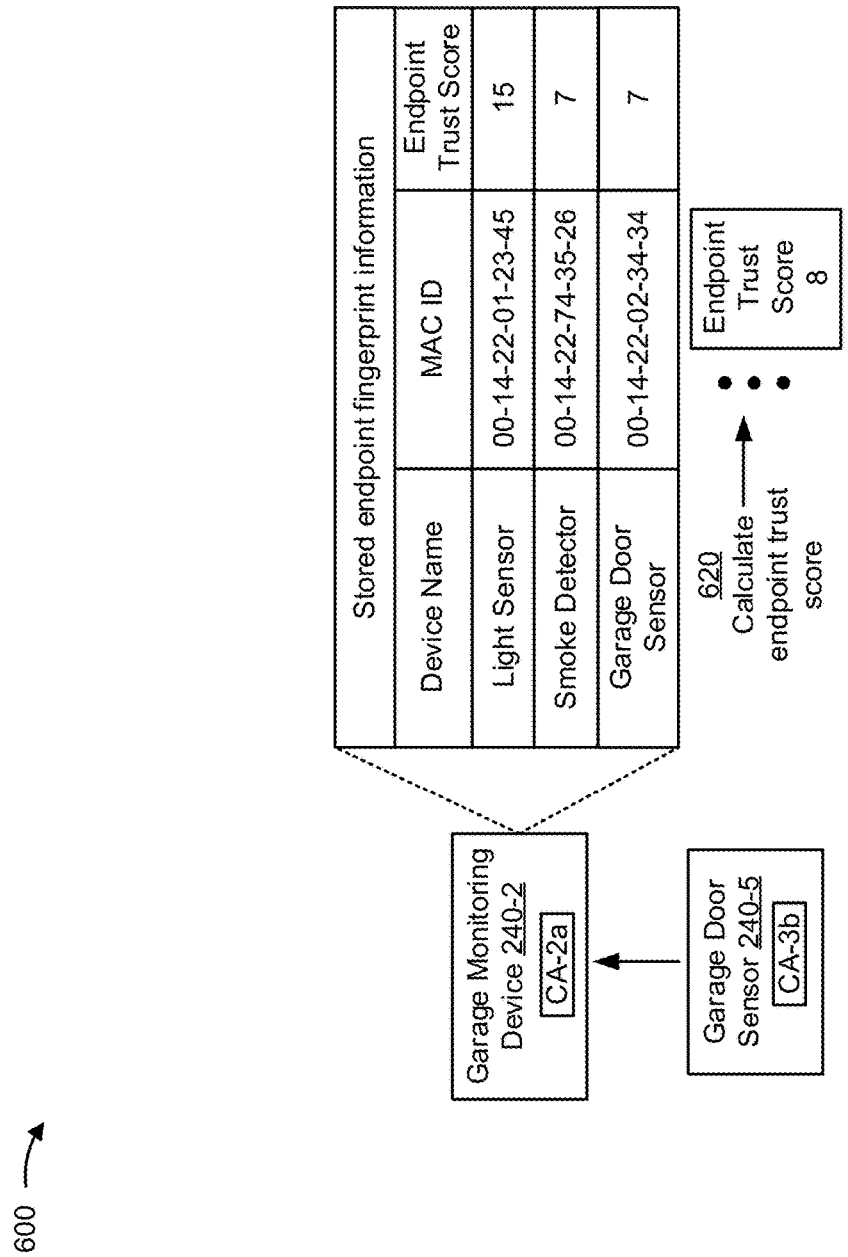

As shown by FIG. 6C, and by reference number 620, P2P server C 250-2 calculates the endpoint trust score. For example, P2P server C 250-2 increases the endpoint trust for IoT device C 240-5 from the calculated endpoint trust score during the first connection request (e.g., increasing the endpoint trust score=7 from the first connection request by 1 so that the endpoint trust score=8) since P2P server C 250-2 has established a secure connection with IoT device C 240-5 before and the secure connection was positive.

Figure 6D:
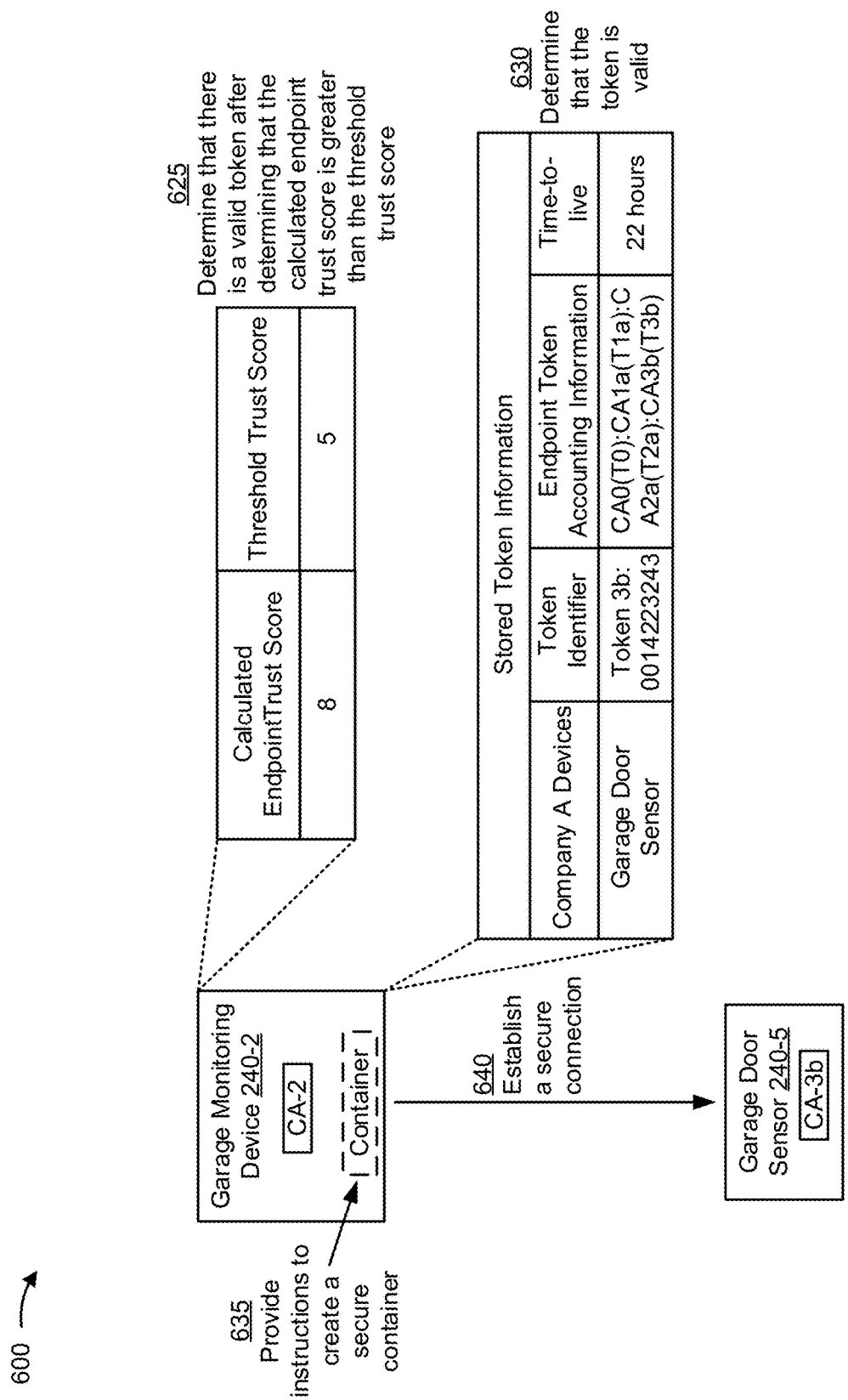

As shown in FIG. 6D, assume that P2P server C 250-2 obtained a threshold trust score (e.g. a threshold trust score=5). As show in FIG. 6D, and shown by reference number 625, since the endpoint trust score is greater than the threshold trust score (e.g., the endpoint trust score=8>the threshold trust score=5), P2P server C 250-2 determines whether there is a token.

As shown in FIG. 6D, and by reference number 630, P2P server C 250-2 determines that there is a token (e.g., Token 3=0014223243), received during the connection request, and that the token is valid (e.g., 22 hours remain for the time-to-live—the 24 hour time-to-live originally calculated minus the 2 hours between the first connection request and the second connection request).

As shown in FIG. 6D, and by reference number 635, P2P server C 250-2 may provide instructions to a P2P client C 245-2 (not shown), included in IoT device C 240-2, to create a secure container to receive the P2P communication.

As shown in FIG. 6D, and by reference number 640, P2P server C 250-2 may establish a secure connection for the P2P communication.

As indicated above, FIGS. 6A-6D are provided merely as an example. Other examples are possible and may differ from what was described with regard to FIGS. 6A-6D.

By permitting a secure connection to be established based on performing an endpoint association including verifying certificate information, performing endpoint fingerprinting, analyzing context information, and using tokens, associated with the digital certificates, IoT devices may communicate asynchronously and securely using P2P communications and/or client-server communications. The endpoint association and tokens may be stored and used to facilitate a subsequent P2P and/or client-server communication. Secure containers may be created to receive, manage, and/or store the P2P and/or client-server communication and data exchange in an isolated manner.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processors to:
        receive a connection request including a digital certificate from an endpoint for establishing a secure connection for a communication,
            the digital certificate including a digital certificate chain identifying one or more certificate authorities associated with the digital certificate, and
            the connection request including endpoint fingerprint information including at least one of:
                device information,
                network information, or
                clock skew information;
        determine whether the digital certificate is valid based on the digital certificate chain identifying one or more certificate authorities trusted by the device;
        determine, based on determining that the digital certificate is valid, whether the endpoint is known based on comparing the endpoint fingerprint information with stored endpoint fingerprint information;
        determine, based on determining that the endpoint is known, whether the connection request includes a valid token;
        generate a token based on the digital certificate being valid and based on an absence of a valid token included in the connection request;
        associate the token with the digital certificate;
        distribute the token to the endpoint; and
        establish the secure connection with the endpoint using the token associated with the digital certificate.

2. The device of claim 1, where the connection request is for establishing at least one of:
    an asynchronous peer-to-peer communication, or
    an asynchronous client-server communication.

3. The device of claim 1, where the connection request includes at least one of endpoint information or token information,
    the endpoint information including the endpoint fingerprint information and further including at least one of:
        certificate information, or
        context information.

4. The device of claim 1, where, when generating the token, the one or more processors are to:
    compare endpoint fingerprint information included in the connection request with stored endpoint fingerprint information;
    calculate an endpoint trust score for the endpoint based on the endpoint fingerprint information matching the stored endpoint fingerprint information; and
    generate the token when the endpoint trust score satisfies a threshold.

5. The device of claim 4, where the one or more processors are further to:
    deny the connection request when the endpoint trust score does not satisfy the threshold.

6. The device of claim 4, where the one or more processors are further to:
    receive a second connection request from the endpoint;
    compare endpoint fingerprint information included in the second connection request with stored endpoint fingerprint information; and
    calculate a new endpoint trust score for the endpoint based on the endpoint fingerprint information matching the stored endpoint fingerprint information by adjusting the endpoint trust score for the endpoint.

7. The device of claim 6, where, when calculating the new endpoint trust score, the one or more processors are to:
    adjust the endpoint trust score by increasing the endpoint trust score for a positive communication associated with the secure connection for the communication; or
    adjust the endpoint trust score by decreasing the endpoint trust score for a negative communication associated with the secure connection for the communication.

8. A computer-readable medium storing instructions, the instructions comprising:

one or more instructions that, when executed by one or more processors of a device, cause the one or more processors to:
- receive a connection request including a digital certificate from an endpoint for establishing a secure connection for a communication,
  - the digital certificate including a digital certificate chain identifying one or more certificate authorities associated with the digital certificate,
  - the connection request including endpoint fingerprint information including at least one of:
    - device information,
    - network information, or
    - clock skew information;
- determine whether the digital certificate is valid based on the digital certificate chain identifying one or more certificate authorities trusted by the device;
- determine, based on determining that the digital certificate is valid, whether the endpoint is known based on comparing the endpoint fingerprint information with stored endpoint fingerprint information;
- determine, based on determining that the endpoint is known, whether the connection request includes a valid token;
- generate a token based on the digital certificate being valid and based on an absence of a valid token included in the connection request;
- associate the token with the digital certificate;
- distribute the token to the endpoint; and
- establish the secure connection with the endpoint using the token associated with the digital certificate.

9. The computer-readable medium of claim 8, where the one or more instructions, when executed by the one or more processors, further cause the one or more processors to:
provide one or more instructions to create a secure container.

10. The computer-readable medium of claim 9, where the secure container is used to at least one of receive, manage, or store data exchanged during the communication in isolation.

11. The computer-readable medium of claim 9, where the one or more instructions, when executed by the one or more processors, further cause the one or more processors to:
flush, from the secure container, data exchanged and stored during the communication.

12. The computer-readable medium of claim 8, where the one or more instructions, when executed by the one or more processors, further cause the one or more processors to:
identify endpoint fingerprint information for the endpoint;
compare the endpoint fingerprint information with stored endpoint fingerprint information; and
determine whether the endpoint is known based on the endpoint fingerprint information matching the stored endpoint fingerprint information.

13. The computer-readable medium of claim 12, where the one or more instructions, when executed by the one or more processors, further cause the one or more processors to:
interrogate the endpoint, based on the endpoint not being known, to identify the endpoint.

14. The computer-readable medium of claim 8, where the one or more instructions, when executed by the one or more processors, further cause the one or more processors to:
deny the connection request when the digital certificate is not valid; and
provide an error message indicating that the digital certificate is not valid.

15. The computer-readable medium of claim 8, where the one or more instructions, that cause the one or more processors to generate the token, cause the one or more processors to:
generate the token using endpoint information; and
calculate a time-to-live for the token using at least one of:
the endpoint information, or
historical token information.

16. A method, comprising:
receiving, by a device, a connection request including a digital certificate from an endpoint for establishing a secure connection for a communication,
the connection request including endpoint fingerprint information including at least one of:
device information,
network information, or
clock skew information;
determining, by the device, whether the endpoint is known based on comparing the endpoint fingerprint information with stored endpoint fingerprint information;
determining, by the device and based on determining that the endpoint is known, whether the connection request includes a connection request token;
generating, by the device, a token based on an absence of a connection request token in the connection request;
associating, by the device, the token with the digital certificate;
distributing, by the device, the token to the endpoint;
providing, by the device, instructions to create a secure container;
establishing, by the device, the secure connection with the endpoint using the token associated with the digital certificate; and
using the secure container to at least one of receive, manage, or store data exchanged during the communication.

17. The method of claim 16, further comprising:
determining whether the digital certificate is valid based on the digital certificate including a digital certificate chain identifying one or more certificate authorities trusted by the device; and
providing an error message that the digital certificate is not valid based on the digital certificate chain not identifying a certificate authority trusted by the device.

18. The method of claim 16, where determining whether the connection request includes the connection request token comprises:
determining whether the connection request token is valid; and
establishing the secure connection with the endpoint based on the connection request token being valid.

19. The method of claim 16, where determining whether the token is valid comprises:
determining whether a time-to-live calculated for the token has not expired.

20. The method of claim 19, further comprising:
providing instructions to automatically flush the secure container when the time-to-live calculated for the token has expired.

* * * * *